(12) United States Patent
Suzuki et al.

(10) Patent No.: US 7,754,371 B2
(45) Date of Patent: Jul. 13, 2010

(54) FUEL CELL DISASSEMBLY METHOD

(75) Inventors: Hiroshi Suzuki, Nishikamo-gun (JP); Nobuo Yodoshi, Aichi-gun (JP); Go Tejima, Toyota (JP); Tomoaki Nakashima, Toyota (JP); Ryo Akagawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 789 days.

(21) Appl. No.: 10/586,334

(22) PCT Filed: Feb. 2, 2005

(86) PCT No.: PCT/JP2005/001973

§ 371 (c)(1),
(2), (4) Date: Jul. 14, 2006

(87) PCT Pub. No.: WO2005/076394

PCT Pub. Date: Aug. 18, 2005

(65) Prior Publication Data

US 2007/0151088 A1    Jul. 5, 2007

(30) Foreign Application Priority Data

Feb. 5, 2004    (JP) .............................. 2004-029771
Dec. 2, 2004    (JP) .............................. 2004-349942

(51) Int. Cl.
*H01M 8/00* (2006.01)
*B23P 19/04* (2006.01)

(52) U.S. Cl. .......................... 429/49; 29/426.1; 429/12; 156/344

(58) Field of Classification Search ....................... None
See application file for complete search history.

(56) References Cited

U.S. PATENT DOCUMENTS

| 3,808,073 A | 4/1974 | Navarre |
| 5,800,939 A | 9/1998 | Mishina et al. |
| 6,016,668 A | 1/2000 | Greiner et al. |
| 6,030,480 A * | 2/2000 | Face et al. .................. 156/160 |

(Continued)

FOREIGN PATENT DOCUMENTS

| EP | 0 700 109 | 3/1996 |
| GB | 892411 | 3/1962 |
| JP | A 06-013100 | 1/1994 |
| JP | A 08-171922 | 7/1996 |

(Continued)

*Primary Examiner*—Dah-Wei D Yuan
*Assistant Examiner*—Katherine Turner
(74) *Attorney, Agent, or Firm*—Oliff & Berridge, PLC

(57) ABSTRACT

Respective heaters 21 through 24 receive power supply and start heating. The heaters 21 through 24 keep heating sealing layers 8 to or over a softening temperature at which the sealing layers 8 are softened or molten. After the sealing layers 8 are softened or molten to weaken the adhesive force between a pair of separators 6 and 7, the heaters 21 through 24 are detached from a fuel cell 10. The worker then completely separates the pair of separators 6 and 7 from each other with some tool or by hand and removes an MEA 2 from the fuel cell 10.

10 Claims, 16 Drawing Sheets

U.S. PATENT DOCUMENTS

| | | | | |
|---|---|---|---|---|
| 6,080,503 | A * | 6/2000 | Schmid et al. | 429/35 |
| 2003/0121601 | A1 * | 7/2003 | Tajima | 156/254 |
| 2003/0186107 | A1 * | 10/2003 | Maston et al. | 429/38 |
| 2007/0134536 | A1 * | 6/2007 | Takase et al. | 429/35 |

FOREIGN PATENT DOCUMENTS

| | | |
|---|---|---|
| JP | A-08-185875 | 7/1996 |
| JP | A 08-329959 | 12/1996 |
| JP | A-10-029214 | 2/1998 |
| JP | A-10-180763 | 7/1998 |
| JP | A 10-321247 | 12/1998 |
| JP | A 11-016594 | 1/1999 |
| JP | A 11-288732 | 10/1999 |
| JP | A 2000-164228 | 6/2000 |
| JP | A-2001-332277 | 11/2001 |
| JP | A 2002-025581 | 1/2002 |
| JP | A-2002-144341 | 5/2002 |
| JP | A 2002-151112 | 5/2002 |
| JP | A-2005-135639 | 5/2005 |
| WO | WO 03-077341 | 9/2003 |

* cited by examiner (a)

(b)

(a)

(b)

FUEL CELL DISASSEMBLY METHOD

FIELD OF INVENTION

The present invention relates to a fuel cell disassembly method of disassembly a fuel cell or a fuel cell stack.

BACKGROUND ART

A fuel cell of a known structure includes: an electrode assembly that has an electrolyte interposed between a pair of electrodes; sealing layers that are formed along periphery of the electrode assembly; and a pair of separators that are arranged across the electrode assembly and bonded to each other via the sealing layers, where one of the separators facing one of the electrodes has an oxidizing gas conduit, while the other of the separators facing the other of the electrodes has a fuel gas conduit. In the fuel cell of this known structure, a supply of hydrogen is fed as a fuel gas to the fuel gas conduit, whereas a supply of the air is fed as an oxidizing gas to the oxidizing gas conduit. Hydrogen is separated into proton and electron at one of the electrodes (anode) facing the fuel gas conduit. The proton passes through the electrolyte and shifts to the other electrode (cathode), while the electron runs through an external circuit and shifts to the cathode. Oxygen included in the air reacts with the proton and the electron to produce water at the cathode. This electrochemical reaction generates an electromotive force. The sealing layer is an adhesive layer for bonding the two separators to each other and functions to prevent direct contact of oxygen with hydrogen on the peripheries of the respective electrodes.

Disassembly of the fuel cell is often required for recovery and recycle of the expensive electrode assembly (especially the electrodes containing noble metal catalysts) from the used fuel cell, for separated collection or disposal of the used fuel cell, and for evaluation of the performance of the electrode assembly in the used fuel cell. For example, a fuel cell disclosed in Japanese Patent Laid-Open Gazette No. 2002-151112 has a linear member placed between sealing layers and a separator. The linear member is pulled out to peel off the sealing layers for disassembly of the fuel cell.

DISCLOSURE OF THE INVENTION

In the prior art fuel cell described in the above cited reference, the worker forcibly pulls the linear member to separate the sealing layer from the separator. The linear member may, however, accidentally be cut in the middle or may not be easily moved. This prior art technique accordingly has difficulty in effectively disassembling the fuel cell.

The object of the invention is thus to provide a fuel cell disassembly method that ensures effective disassembly of a fuel cell according to the requirements.

In order to attain at least part of the above and the other related objects, the present invention is directed to a first fuel cell disassembly method of disassembling a fuel cell where a pair of separators arranged across an electrode assembly are bonded to each other via an adhesive layer. The first fuel cell disassembly method includes a separation facilitating step of causing external heating means to apply heat to the adhesive layer, so as to soften or melt the adhesive layer and thereby facilitate separation of the pair of separators from each other.

In the first fuel cell disassembly method of the invention, the separation facilitating step causes the external heating means to apply heat to the adhesive layer, so as to soften or melt the adhesive layer and thereby facilitate separation of the pair of separators. The softened or molten adhesive layer weakens the adhesive force between the separators and thereby facilitates separation of the pair of separators. This arrangement ensures effective disassembly of the fuel cell according to the requirements. The technique of the invention is applicable to any types of fuel cells including polymer electrolyte fuel cells, solid oxide fuel cells, molten carbonate fuel cells, phosphoric acid fuel cells, and alkaline fuel cells. The technique of the invention is applied to disassembly of individual fuel cells, as well as to disassembly of a fuel cell stack obtained by laying multiple fuel cells one upon another directly or indirectly via intermediates.

In the first fuel cell disassembly method of the invention, it is preferable that the separation facilitating step locates the external heating means to be in contact with or close to at least one of the separators. The external heating means is readily arranged in this structure, since the separators have a relatively wide area. In this structure, the heat of the external heating means is applied to the adhesive layer via the separator.

In the first fuel cell disassembly method of the invention, it is also preferable that the separation facilitating step locates the external heating means to cover over a gap between the pair of separators. The adhesive layer is placed in the gap between the pair of separators. This structure thus enables the external heating means to readily apply heat to the adhesive layer.

In the first fuel cell disassembly method of the invention, it is further preferable that the separation facilitating step locates the external heating means along the adhesive layer. This arrangement ensures efficient application of heat from the external heating means to the adhesive layer.

In the first fuel cell disassembly method of the invention, it is also preferable that the separation facilitating step causes the external heating means to apply heat to the adhesive layer to be not lower than a softening temperature of the adhesive layer but lower than an upper temperature limit of the electrode assembly. This arrangement desirably prevents the electrode assembly from being significantly altered or deteriorated by the heat application, which softens or melts the adhesive layer.

In the first fuel cell disassembly method of the invention, it is further preferable that the separation facilitating step causes the external heating means to apply heat to the adhesive layer, while an external force is applied by external force application means to the adhesive layer in a direction of mutually parting the pair of separators. While the adhesive layer is softened or molten to weaken the adhesive force between the pair of separators, the external force is applied in the direction of mutually parting the pair of separators. This arrangement thus further facilitates separation of the pair of separators. The external force application means may be a wedge-like member pressed in a direction of insertion into a gap between the pair of separators. As the adhesive force of the adhesive layer is weakened, the wedge-like member enters the depth of the gap between the pair of separators to expand the gap. This arrangement thus further facilitates separation of the pair of separators. The external force application means may be inserted into the gap between the pair of separators while being heated by the external heating means. This arrangement ensures additional application of heat to the adhesive layer via the external force application means. The external force application means may apply the external force to an extension of one of the separators to separate one of the separators from the other of the separators. This structure uses the extension of one of the separators to easily separate the pair of separators from each other. The extension may be rims provided on side faces of the separator.

In the first fuel cell disassembly method of the invention, it is preferable that the separation facilitating step causes the external heating means to apply heat to the adhesive layer while applying an external force to the adhesive layer in a direction of mutually parting the pair of separators. While the adhesive layer is softened or molten to weaken the adhesive force between the pair of separators, the external force is applied in the direction of mutually parting the pair of separators. This arrangement thus further facilitates separation of the pair of separators. This arrangement does not require the external force application means, in addition to the external heating means, thus desirably simplifying the whole structure.

In the first fuel cell disassembly method of the invention, it is also preferable that the adhesive layer is arranged around periphery of the electrode assembly and has a sealing function to prevent leakage of a gas fed to the electrode assembly. The adhesive layer having the sealing function desirably simplifies the whole structure, compared with the conventional structure having separate sealing layer and adhesive layer. The adhesive layer may be made by solidifying an adhesive or may be formed by a gasket. The material of the adhesive or the gasket is, for example, fluoroplastic or silicone resin.

In one preferable embodiment of the first fuel cell disassembly method of the invention, plurality of the fuel cells are layered to form a fuel cell stack, and the separation facilitating step causes the external heating means to additionally apply heat to an inter-cell adhesive layer that bonds adjoining fuel cells to each other directly or indirectly via an intermediate in the fuel cell stack, so as to soften or melt the inter-cell adhesive layer and thereby facilitate separation of the adjoining fuel cells. This arrangement effectively facilitates disassembly of the fuel cell stack.

The present invention is also directed to a first fuel cell stack disassembly method of disassembling a fuel cell stack having an inter-cell adhesive layer that bonds adjoining fuel cells to each other directly or indirectly via an intermediate. The first fuel cell stack disassembly method includes a separation facilitating step of causing external heating means to apply heat to the inter-cell adhesive layer, so as to soften or melt the inter-cell adhesive layer and thereby facilitate separation of the adjoining fuel cells.

In the first fuel cell stack disassembly method of the invention, the separation facilitating step causes the external heating means to apply heat to the inter-cell adhesive layer, so as to soften or melt the inter-cell adhesive layer. The softened or molten inter-cell adhesive layer weakens the adhesive force between the adjoining fuel cells and thereby facilitates separation of the adjoining fuel cells. This arrangement ensures effective disassembly of the fuel cell stack according to the requirements.

The present invention is further directed to a second fuel cell disassembly method of disassembling a fuel cell where a pair of separators arranged across an electrodes assembly are bonded to each other via an adhesive layer. The second fuel cell disassembly method includes a separation facilitating step of causing external heat removal means to remove heat from the adhesive layer, so as to contract the adhesive layer and thereby facilitate separation of the pair of separators from each other.

In the second fuel cell disassembly method of the invention, the separation facilitating step causes the external heat removal means to remove heat from the adhesive layer, so as to contract the adhesive layer and thereby facilitate separation of the pair of separators. The cooled and contracted adhesive layer weakens the adhesive force between the separators and thereby facilitates separation of the pair of separators. This arrangement ensures effective disassembly of the fuel cell according to the requirements.

In the second fuel cell disassembly method of the invention, it is preferable that the separation facilitating step locates the external heat removal means to be in contact with or close to at least one of the separators. The external heat removal means is readily arranged in this structure, since the separators have a relatively wide area. In this structure, the external heat removal means removes heat from the adhesive layer via the separator.

In the second fuel cell disassembly method of the invention, it is also preferable that the separation facilitating step locates the external heat removal means to cover over a gap between the pair of separators. The adhesive layer is placed in the gap between the pair of separators. This structure thus enables the external heat removal means to readily remove heat from the adhesive layer.

In the second fuel cell disassembly method of the invention, it is further preferable that the separation facilitating step locates the external heat removal means along the adhesive layer. This arrangement ensures efficient removal of heat from the adhesive layer by the external heat removal means.

In the second fuel cell disassembly method of the invention, it is further preferable that the separation facilitating step causes the external heat removal means to remove heat from the adhesive layer, while an external force is applied by external force application means to the adhesive layer in a direction of mutually parting the pair of separators. While the adhesive layer is cooled down and contracted to weaken the adhesive force between the pair of separators, the external force is applied in the direction of mutually parting the pair of separators. This arrangement thus further facilitates separation of the pair of separators. The external force application means may be a wedge-like member pressed in a direction of insertion into a gap between the pair of separators. As the adhesive force of the adhesive layer is weakened, the wedge-like member enters the depth of the gap between the pair of separators to expand the gap. This arrangement thus further facilitates separation of the pair of separators. The external force application means may be inserted into the gap between the pair of separators while being cooled down for heat removal by the external heat removal means. This arrangement ensures additional removal of heat from the adhesive layer via the external force application means. The external force application means may apply the external force to an extension of one of the separators to separate one of the separators from the other of the separators. This structure uses the extension of one of the separators to easily separate the pair of separators from each other. The extension may be rims provided on side faces of the separator.

In the second fuel cell disassembly method of the invention, it is preferable that the separation facilitating step causes the external heat removal means to remove heat from the adhesive layer while applying an external force to the adhesive layer in a direction of mutually parting the pair of separators. While the adhesive layer is cooled down and contracted to weaken the adhesive force between the pair of separators, the external force is applied in the direction of mutually parting the pair of separators. This arrangement thus further facilitates separation of the pair of separators. This arrangement does not require the external force application means, in addition to the external heat removal means, thus desirably simplifying the whole structure.

In the second fuel cell disassembly method of the invention, it is also preferable that the adhesive layer is arranged around periphery of the electrode assembly and has a sealing function to prevent leakage of a gas fed to the electrode assembly. The adhesive layer having the sealing function desirably simplifies the whole structure, compared with the conventional structure having separate sealing layer and adhesive layer. The adhesive layer may be made by solidifying an adhesive or may be formed by a gasket. The material of the adhesive or the gasket is, for example, fluoroplastic or silicone resin.

In one preferable embodiment of the second fuel cell disassembly method of the invention, plurality of the fuel cells are layered to form a fuel cell stack, and the separation facilitating step causes the external heat removal means to additionally remove heat from an inter-cell adhesive layer that bonds adjoining fuel cells to each other directly or indirectly via an intermediate in the fuel cell stack, so as to contract the inter-cell adhesive layer and thereby facilitate separation of the adjoining fuel cells. This arrangement effectively facilitates disassembly of the fuel cell stack.

The present invention is also directed to a second fuel cell stack disassembly method of disassembling a fuel cell stack having an inter-cell adhesive layer that bonds adjoining fuel cells to each other directly or indirectly via an intermediate. The second fuel cell stack disassembly method includes a separation facilitating step of causing external heat removal means to remove heat from the inter-cell adhesive layer, so as to contract the inter-cell adhesive layer and thereby facilitate separation of the adjoining fuel cells.

In the second fuel cell stack disassembly method of the invention, the separation facilitating step causes the external heat removal means to remove heat from the inter-cell adhesive layer, so as to contract the inter-cell adhesive layer. The cooled and contracted adhesive layer weakens the adhesive force between the adjoining fuel cells and thereby facilitates separation of the adjoining fuel cells. This arrangement ensures effective disassembly of the fuel cell stack according to the requirements.

BEST MODES OF CARRYING OUT THE INVENTION

Some modes of carrying out the invention are discussed below as preferred embodiments.

First Embodiment

Figure 1:
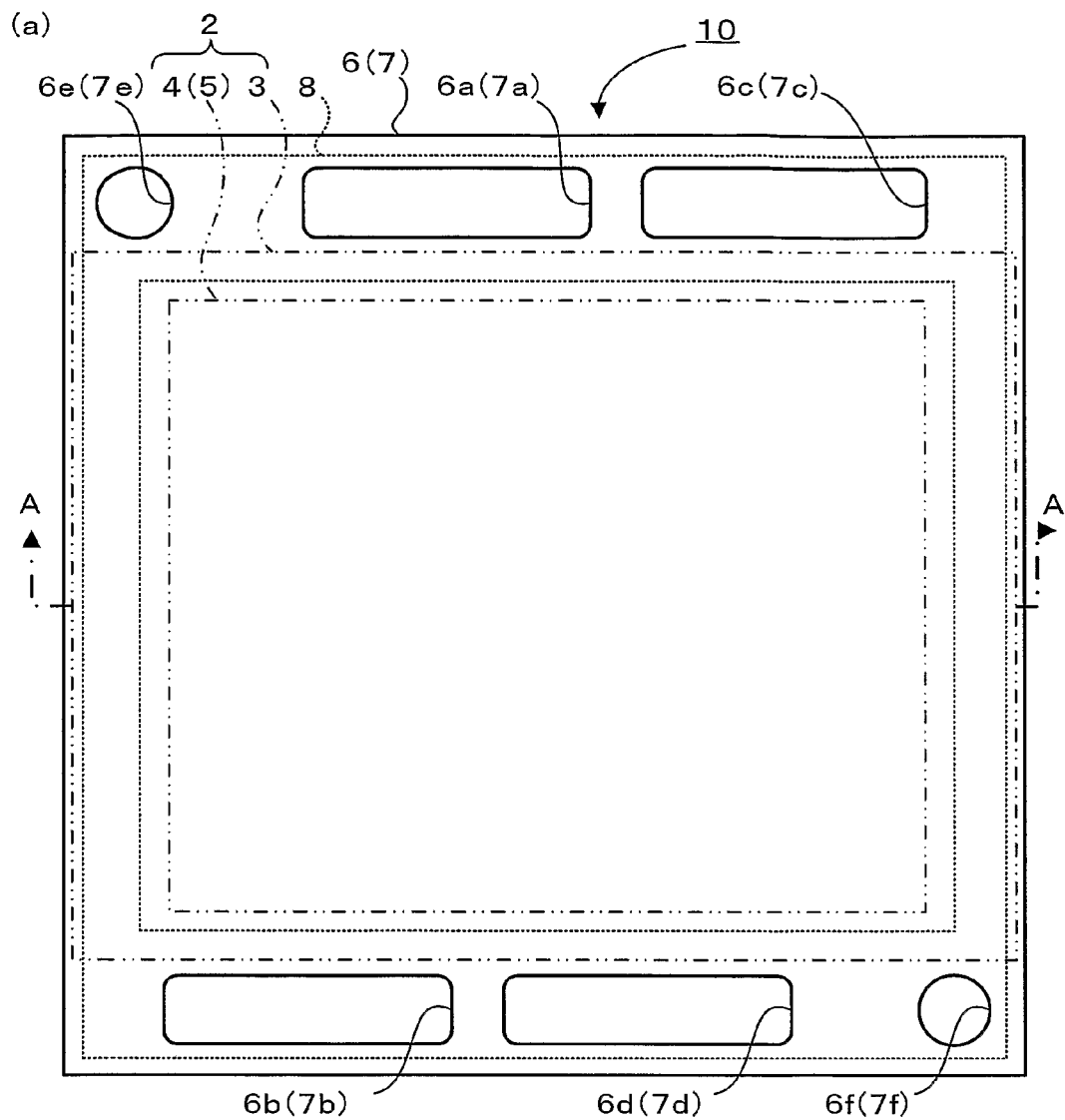
FIG. 1 schematically illustrates the structure of a fuel cell 10 in a first embodiment of the invention.
Figure 1:
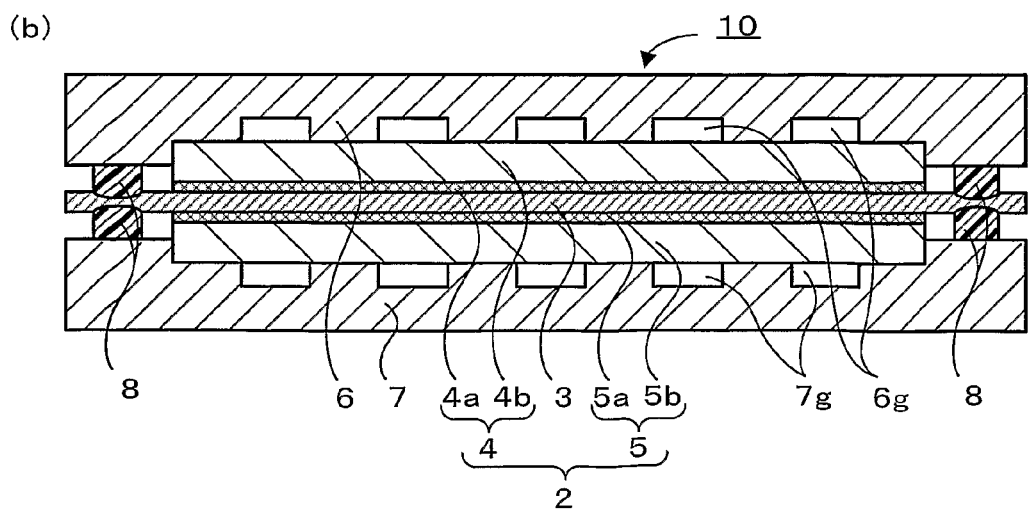

FIG. 1 schematically illustrates the structure of a fuel cell 10 in a first embodiment of the invention. FIG. 1(a) is a plan view, and FIG. 1(b) is a sectional view taken on a line A-A of FIG. 1(a).

The fuel cell 10 of this embodiment is a polymer electrolyte fuel cell and includes, as main constituents, a membrane electrode assembly (hereafter referred to as MEA) 2 having an electrolyte membrane 3 interposed between a pair of electrodes 4 and 5, sealing layers 8 located to surround the outer circumference of the MEA 2, and a pair of separators 6 and 7 arranged across the MEA 2 and bonded to the sealing layers 8. The fuel cell 10 is a unit cell having an electromotive force in a range of about 0.6 to 0.8 V. A large number of the fuel cells 10 are tightly laid one upon another to form a direct current power source of several hundred volts as a power supply of, for example, a drive motor of the vehicle.

The MEA 2 has the electrolyte membrane 3 located between the fuel electrode or anode 4 and the oxygen electrode or cathode 5. In the structure of the MEA 2 of the embodiment, the area of the electrolyte membrane 3 is greater than the areas of the anode 4 and the cathode 5. The electrolyte membrane 3 is mainly made of a solid polymer material having good proton conductivity in wet state, such as a fluororesin membrane (for example, a Nafion membrane manufactured by DuPont). The anode 4 and the cathode 5 respectively have catalyst electrodes $4a$ and $5a$ and gas diffusion electrodes $4b$ and $5b$. The catalyst electrodes $4a$ and $5a$ are located to be in contact with the electrolyte membrane 3 and are made of electrically conductive carbon black with fine platinum particles carried thereon. The gas diffusion electrodes $4b$ and $5b$ are laid upon the catalyst electrodes $4a$ and $5a$ and made of carbon cloth of carbon fibers. Platinum contained in the catalyst electrodes $4a$ and $5a$ function to accelerate separation of hydrogen into proton and electron, as well as production of water from oxygen, proton, and electron. Any other catalyst having the same functions may be used in place of platinum. The gas diffusion electrodes $4b$ and $5b$ are not restricted to the carbon cloth but may be made of carbon paper or carbon felt of carbon fibers. The carbon material is demanded to have sufficient gas diffusion property and electrical conductivity.

The separators 6 and 7 are made of a gas-impermeable electrically conductive material, for example, gas-impermeable molded carbon or a metal, such as stainless steel. The separators 6 and 7 respectively have fuel gas supply inlets $6a$ and $7a$ for supply of a fuel gas, fuel gas discharge outlets $6b$ and $7b$ for discharge of the fuel gas, oxidizing gas supply inlets $6c$ and $7c$ for supply of an oxidizing gas, oxidizing gas discharge outlets $6d$ and $7d$ for discharge of the oxidizing gas, coolant supply inlets $6e$ and $7e$ for supply of a coolant (for example, a cooling fluid), and coolant discharge outlets $6f$ and 7f for discharge of the coolant. One of the separators 6 has a fuel gas conduit 6g on a face in contact with the anode 4 of the MEA 2 to allow passage of the fuel gas, and a coolant conduit (not shown) on the opposite face to allow passage of the coolant. The fuel gas conduit 6g has multiple channels that are connected to the fuel gas supply inlet 6a and the fuel gas discharge outlet 6b, while not being connected to the other inlets or outlets. The coolant conduit is, on the other hand, connected to the coolant supply inlet 6e and the coolant discharge outlet 6f, while not being connected to the other inlets or outlets. The other of the separators 7 has an oxidizing gas conduit 7g on a face in contact with the cathode 5 of the MEA 2 to allow passage of the oxidizing gas, and a coolant conduit (not shown) on the opposite face to allow passage of the coolant. The oxidizing gas conduit 7g has multiple channels that are connected to the oxidizing gas supply inlet 7c and the oxidizing gas discharge outlet 7d, while not being connected to the other inlets or outlets. The coolant conduit is, on the other hand, connected to the coolant supply inlet 7e and the coolant discharge outlet 7f, while not being connected to the other inlets or outlets.

The sealing layers 8 are formed by solidifying an adhesive (for example, an epoxy adhesive) applied over the whole outer circumference of the electrolyte membrane 3 of the MEA 2 without the anode 4 and the cathode 5. The sealing layers 8 correspond to the adhesive layer of the present invention. The sealing layers 8 seal the space for the fuel gas defined by the electrolyte membrane 3 and the separator 6, while sealing the space for the oxidizing gas defined by the electrolyte membrane 3 and the separator 7. The sealing layers 8 have through holes formed at specific positions corresponding to the respective inlets and outlets 6a through 6f and 7a through 7f formed in the separators 6 and 7.

The following describes power generation of the fuel cell 10. For power generation of the fuel cell 10, a supply of humidified hydrogen is fed as the fuel gas to the fuel gas supply inlets 6a and 7a, while a supply of the air is fed as the oxidizing gas to the oxidizing gas supply inlets 6c and 7c. The flow of hydrogen goes from the fuel gas supply inlet 6a through the fuel gas conduit 6g to the fuel gas discharge outlet 6b to be discharge outside. The flow of the air goes from the oxidizing gas supply inlet 7c through the oxidizing gas conduit 7g to the oxidizing gas discharge outlet 7d to be discharge outside. The flow of hydrogen passes through the fuel gas conduit 6g, is diffused by the gas diffusion electrode 4b of the anode 4 to reach the catalyst electrode 4a, and is separated into proton and electron by the function of the catalyst electrode 4a. The protons are transmitted through the electrolyte membrane 3 in the wet state and are shifted to the cathode 5. The electrons pass through a non-illustrated external pathway to be shifted to the cathode 5. The flow of the air passes through the oxidizing gas conduit 7g, and is diffused by the gas diffusion electrode 5b to reach the catalyst electrode 5a. The proton, the electron, and oxygen in the air react to produce water and generate an electromotive force at the cathode 5. A supply of the coolant is externally fed into the coolant supply inlets 6e and 7e to keep the temperature of the fuel cell 10 in an adequate temperature range for power generation (for example, 70 to 80° C.). The flow of the coolant goes through the non-illustrates coolant conduits formed in the separators 6 and 7, is discharged from the coolant discharge outlets 6f and 7f, is cooled down by a non-illustrated heat exchanger, and is recirculated into the coolant supply inlets 6e and 7e. The electrolyte membrane 3 of the MEA 2 works to conduct the proton, while functioning as an insulation membrane to prevent the air from directly coming into contact with the hydrogen inside the fuel cell 10. The sealing members 8 prevent the air from being mixed with the hydrogen on the periphery of the MEA 2, while preventing the air and the hydrogen from leaking out of the fuel cell 10.

Figure 2:
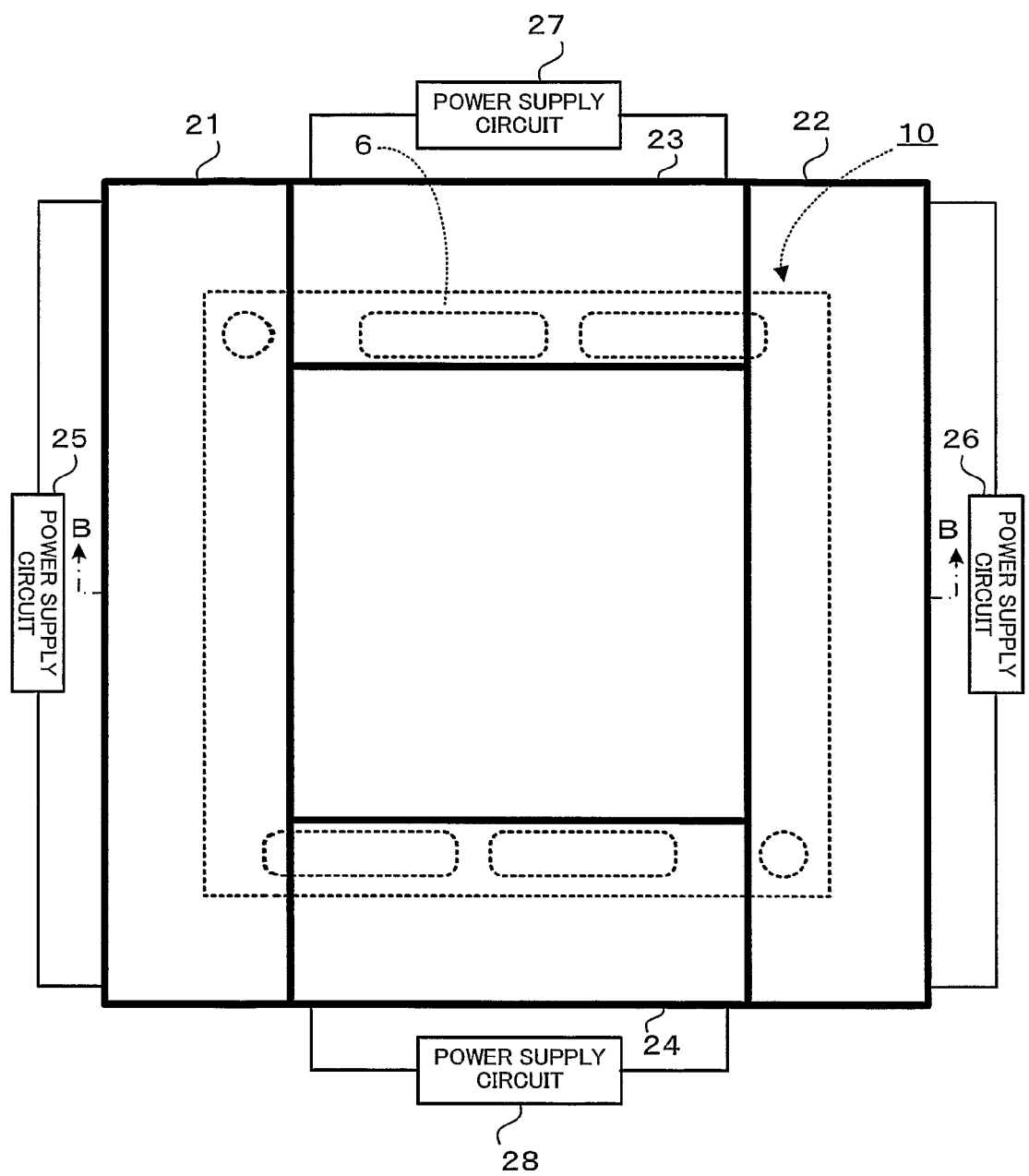
FIG. 2 is a plan view showing arrangement of heaters.
Figure 3:
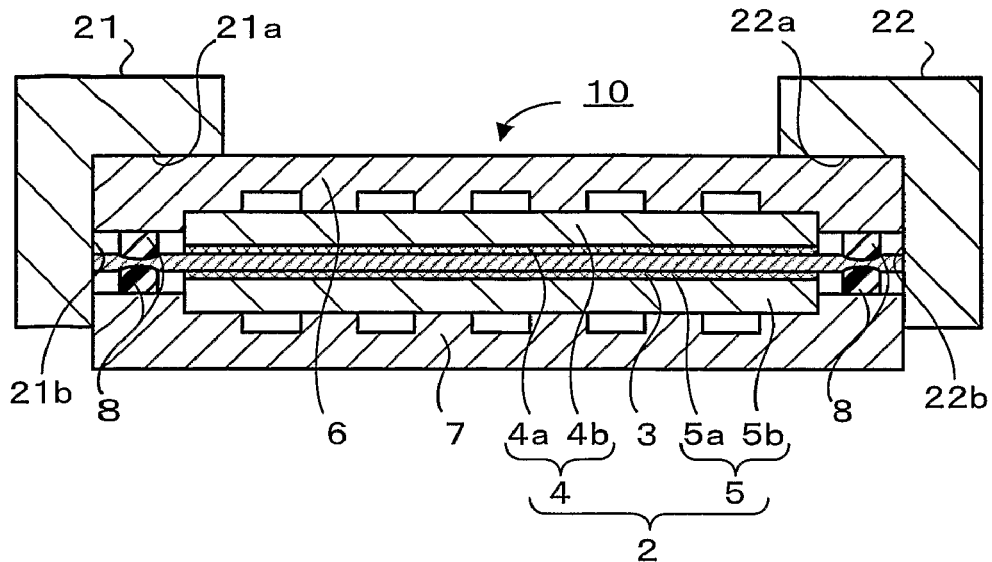
FIG. 3 is a sectional view taken on the line B-B of FIG. 2.
Figure 4:
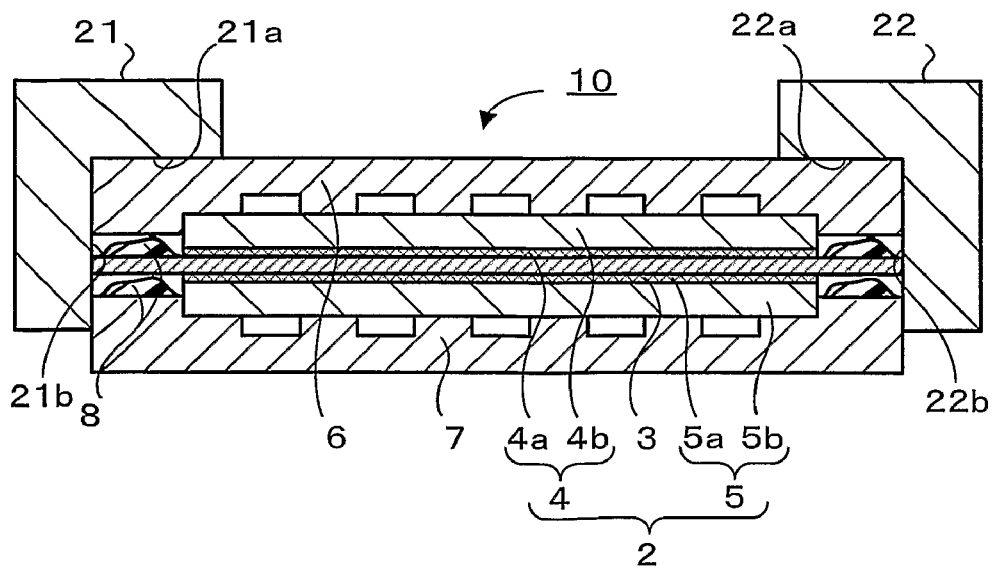
FIG. 4 is a sectional view showing the softened and molten sealing layers 8.

The procedure of disassembling the fuel cell 10 is described with reference to FIGS. 2 through 4. FIG. 2 is a plan view showing arrangement of heaters 21 through 24 set on the fuel cell 10. FIG. 3 is a sectional view taken on the line B-B of FIG. 2. FIG. 4 is a sectional view showing the sealing layers 8 softened by means of the heaters 21 through 24. As shown in FIG. 2, electric heaters 21 through 24 are located along four sides of the upper separator 6 of the fuel cell 10, that is, along the sealing layers 8. These heaters 21 through 24 correspond to the external heating means of the present invention. As shown in FIG. 3, the heaters 21 and 22 are formed in substantially L-shaped cross section and respectively have upper separator contact planes 21a and 22a that are in contact with the separator 6 and gap cover planes 21b and 22b that cover the gaps between the separators 6 and 7. Like the heaters 21 and 22, the heaters 23 and 24 are also formed in substantially L-shaped cross section and have separator contact planes that are in contact with the separator 6 and gap cover planes that cover the gaps between the separators 6 and 7, although not being specifically illustrated. The heaters 21 and 24 are respectively connected to power supply circuits 25 through 28 as shown in FIG. 2. The power supply circuits 25 through 28 are regulated to start or cut off the power supply to the respective heaters 21 through 24, so as to control on and off the heaters 21 through 24. The respective heaters 21 through 24 receive the power supply and start heating. The electrolyte membrane 3 of the MEA 2 is made of a sulfonic acid group-containing fluorinated polymer having an upper temperature limit of about 230° C., whereas the sealing layers 8 are made of an epoxy resin having a softening temperature of about 130° C. The power supply to the heaters 21 through 24 is regulated to heat the sealing layers 8 in a temperature range of 130 to 200° C. The heaters 21 through 24 keep heating the sealing layers 8 to or over the softening temperature at which the sealing layers 8 are softened or molten as shown in FIG. 4. After the sealing layers 8 are softened or molten to weaken the adhesive force between the pair of separators 6 and 7, the heaters 21 through 24 are detached from the fuel cell 10. The worker then completely separates the pair of separators 6 and 7 from each other with some tool or by hand and removes the MEA 2 from the fuel cell 10.

As described above, in the structure of this embodiment, the heaters 21 through 24 are used to apply heat to the sealing layers 8 and thereby soften or melt the sealing layers 8, in order to facilitate the mutual separation of the pair of separators 6 and 7. The softened or molten sealing layers 8 weaken the adhesive force between the separators 6 and 7 and thereby facilitate mutual separation of the pair of separators 6 and 7. This arrangement ensures effective disassembly of the fuel cell 10. The heaters 21 through 24 are readily arranged to be in contact with the separator 6 having a relatively wide area. The heaters 21 through 24 are also arranged to cover the gaps between the separators 6 and 7. This arrangement ensures effective application of heat to the sealing layers 8 located in the gaps. The heat of the heaters 21 through 24 is applied to the sealing layers 8 via the gaps between the separators 6 and 7, as well as via the separator 6. This arrangement ensures a quick temperature rise of the sealing layers 8. The heaters 21 through 24 are located along the sealing layers 8. This arrangement enables the heat of the heaters 21 through 24 to be efficiently applied to the sealing layers 8. The heat applied to the sealing layers 8 by the heaters 21 through 24 is not lower than the softening temperature of the sealing layers 8 but is lower than the upper temperature limit of the MEA 2.

The MEA 2 is thus not significantly altered or deteriorated by the heat application, which softens or melts the sealing layers 8. The separators 6 and 7 are bonded to each other via the sealing layers 8, which have the sealing function to prevent leakage of the fuel gas and the oxidizing gas fed to the MEA 2. This structure is desirably simpler than the conventional structure having separate sealing members and adhesive members.

The embodiment discussed above is to be considered in all aspects as illustrative and not restrictive. There may be many modifications, changes, and alterations without departing from the scope or spirit of the main characteristics of the present invention.

Figure 5:
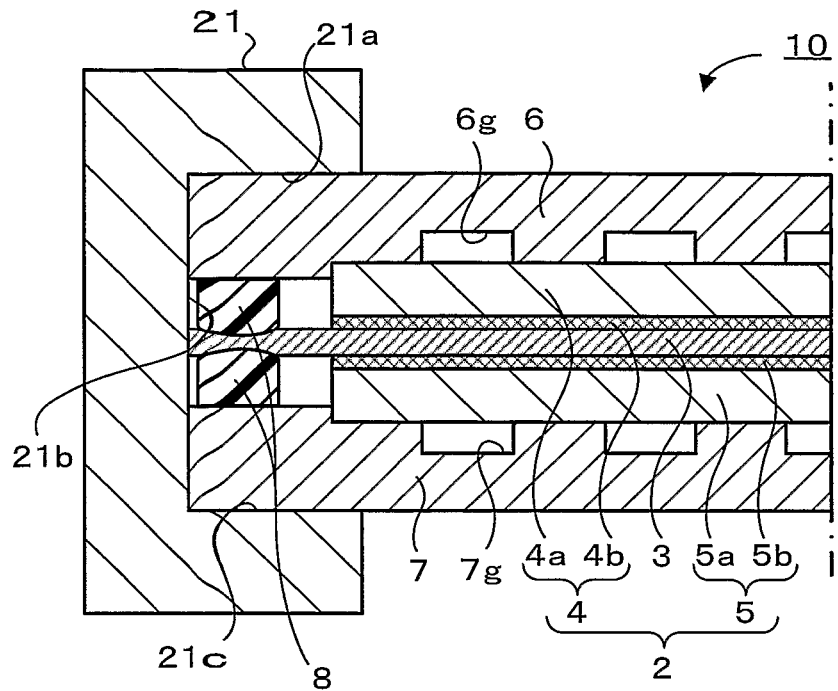
FIG. 5 is a sectional view showing arrangement of heaters of one modified form.
Figure 6:
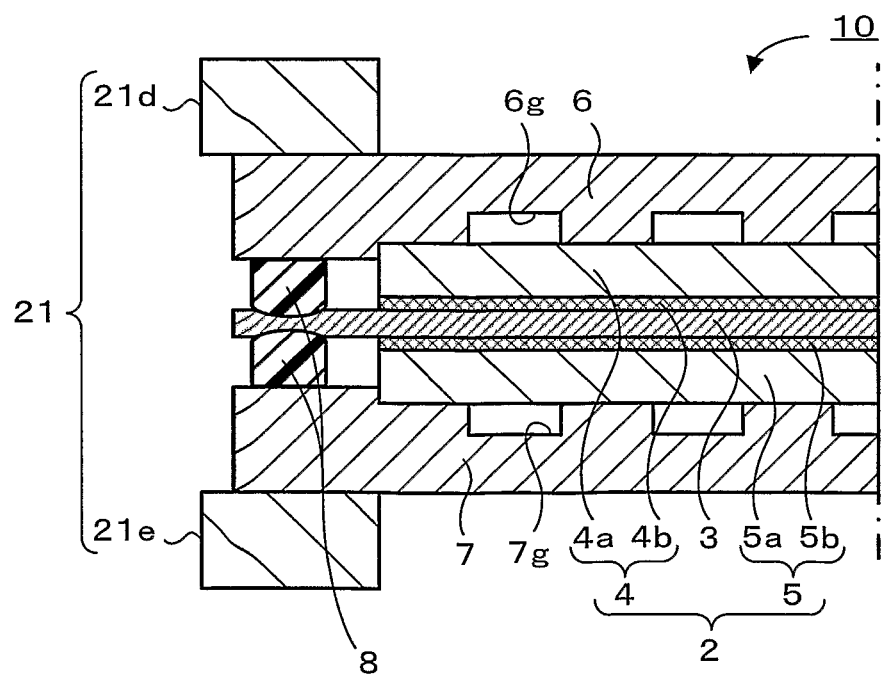
FIG. 6 is a sectional view showing arrangement of heaters of another modified form.

For example, in the above embodiment, the respective heaters 21 through 24 are formed in substantially L-shaped cross section. As shown in FIG. 5, each heater may have a substantially C-shaped cross section. The heater 21 may have an upper separator contact plane 21a that is in contact with the separator 6, a gap cover plane 21b that covers the gap between the separators 6 and 7, and a lower separator contact plane 21c that is in contact with the separator 7. The other heaters 22 through 24 may be formed to have a similar cross section to that of the heater 21. The heat of the heaters 21 through 24 is applied to the sealing layers 8 via the gaps between the separators 6 and 7, as well as via the separator 6 and via the separator 7. This arrangement ensures a quicker temperature rise of the sealing layers 8. As shown in FIG. 6, each heater may have upper and lower split sections. The heater 21 may have an upper separator contact section 21d that is in contact with the separator 6 and a lower separator contact section 21e that is in contact with the separator 7. The other heaters 22 through 24 may be formed to have similar split sections to those of the heater 21. The heat of the heaters 21 through 24 is applied to the sealing layers 8 via the separator 6 and via the separator 7. This arrangement ensures a relatively quick temperature rise of the sealing layers 8. The heater 21 may be formed as a member having only the upper separator contact plane 21a that is in contact with the separator 6, as a member having only the gap cover plane 21b that covers the gap between the separators 6 and 7, or as a member having only the lower separator contact plane 21c that is in contact with the separator 7.

Figure 7:
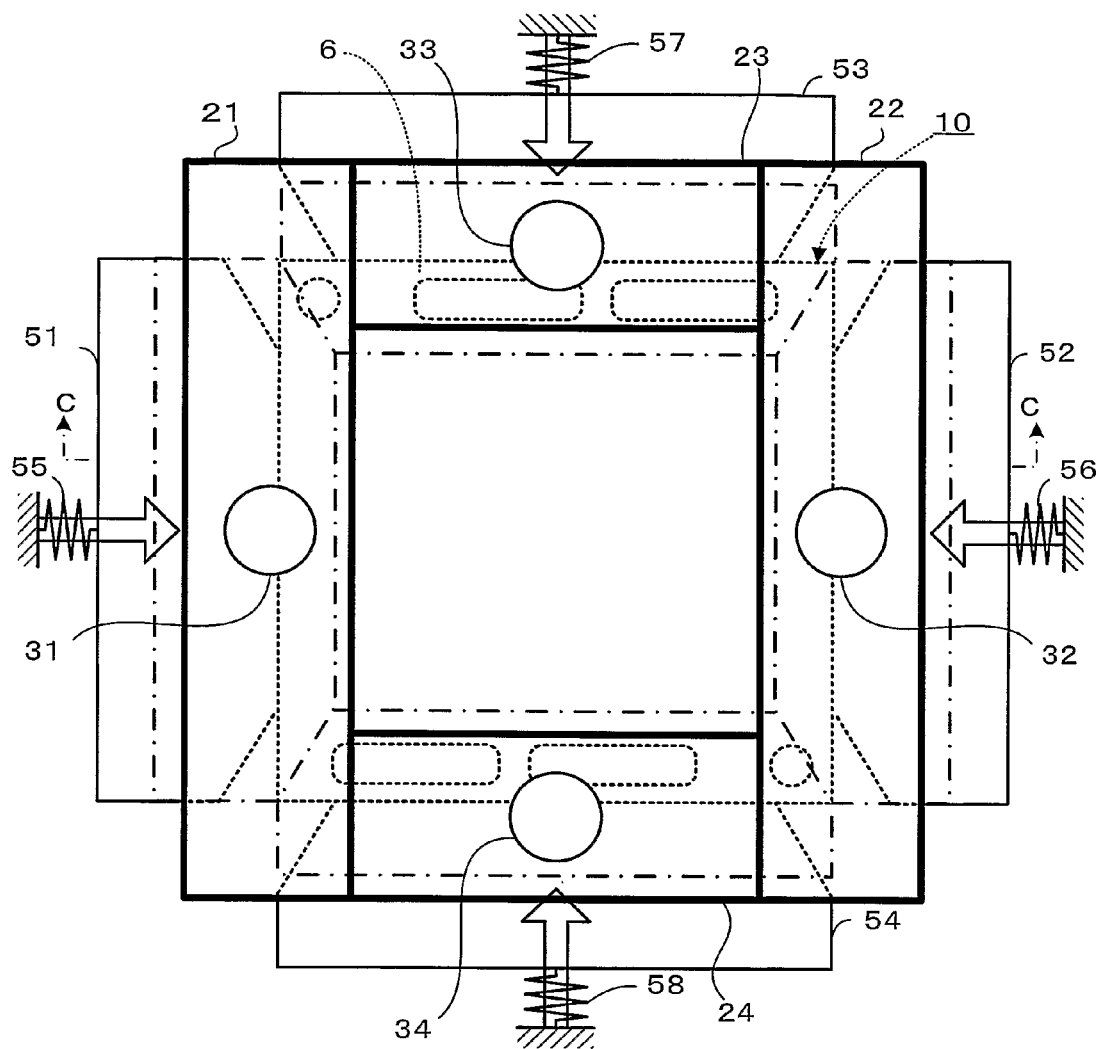
FIG. 7 is a plan view showing arrangement of the heaters and insertion members.
Figure 8:
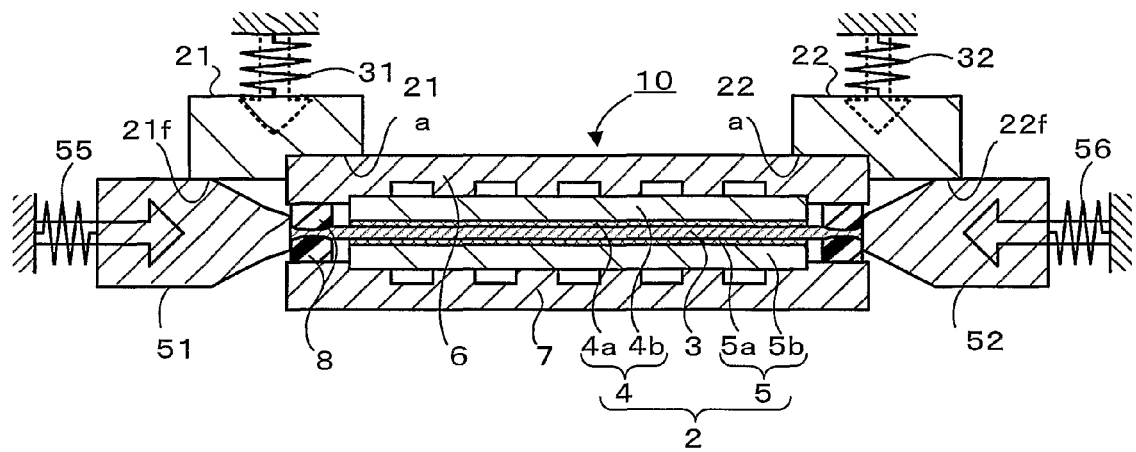
FIG. 8 is a sectional view taken on the line C-C of FIG. 7.
Figure 9:
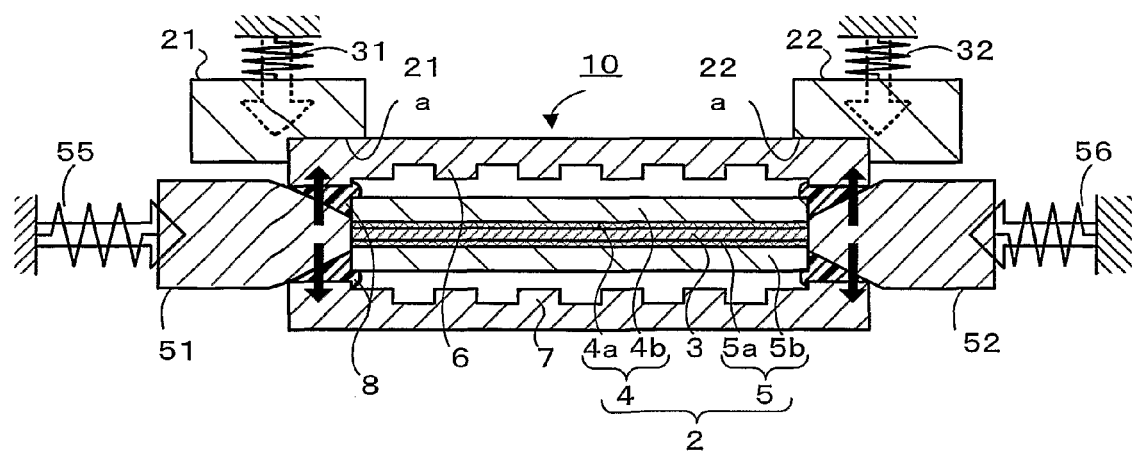
FIG. 9 is a sectional view showing the softened and molten sealing layers.

In the structure of the above embodiment, an external force may be applied in a direction of mutually parting the pair of separators 6 and 7 under application of heat of the respective heaters 21 through 24 to the sealing layers 8 as shown in FIGS. 7 through 9. FIG. 7 is a plan view showing arrangement of the heaters 21 through 24 and insertion members 51 through 54 set on the fuel cell 10. FIG. 8 is a sectional view taken on the line C-C of FIG. 7. FIG. 9 is a sectional view showing the softened and molten sealing layers 8. As shown in FIGS. 7 and 8, the insertion members 51 through 54 having wedge-like ends are located on the respective sides of the substantially rectangular fuel cell 10 to be inserted between the separators 6 and 7. Springs 55 through 58 as pressing members press the insertion members 51 through 54 in a direction of insertion between the separators 6 and 7. Other springs 31 through 34 as pressing members press the heaters 21 through 24 toward the separator 6. As shown in FIG. 8, the heaters 21 and 22 among the heaters 21 through 24 are pressed by the corresponding springs 31 and 32 to be forcibly in contact with the separator 6 and the insertion members 51 and 52. The heaters 21 and 22 are formed in substantially L-shaped cross section but do not cover the gaps between the separators 6 and 7 unlike the structure of the embodiment. The heaters 21 and 22 are formed to have upper separator contact planes 21a and 22a that are in contact with the separator 6 and insertion member contact planes 21f and 22f that are in contact with the insertion members 51 and 52. The heaters 23 and 24 are formed to have similar cross sections to those of the heaters 21 and 22, although not being specifically illustrated. The respective heaters 21 through 24 receive the power supply and start heating. Heating raises the temperature of the sealing layers 8 to be not lower than the softening temperature of the sealing layers 8 but lower than the upper temperature limit of the MEA 2. The heaters 21 through 24 keep heating the sealing layers 8 to or over the softening temperature at which the sealing layers 8 are softened or molten. As the sealing layers 8 are softened or molten to weaken the adhesive force between the pair of separators 6 and 7, the wedge-like ends of the respective insertion members 51 through 54 enter the depths of the gaps between the separators 6 and 7. This applies the force of expanding the gaps between the separators 6 and 7 (see the black arrows in FIG. 9), that is, the external force in the direction of mutually parting the separators 6 and 7. The insertion members 51 through 54 thus further facilitate separation of the separators 6 and 7. The insertion members 51 through 54 are located at the positions of the solid lines and the doted lines in FIG. 7, prior to heating. After heating, the insertion members 51 through 54 are inserted to the positions of the one-dot chain lines in FIG. 7. The insertion members 51 through 54 are inserted into the gaps between the separators 6 and 7, while being heated by the heaters 21 through 24. The sealing layers 8 thus additionally receive heat via the insertion members 51 through 54. This ensures a quicker temperature rise of the sealing layers 8. The heaters 21 through 24 may be omitted from the structure of FIGS. 7 through 9, and the insertion members 51 through 54 may be designed to have heating functions. This desirably simplifies the whole structure.

Figure 10:
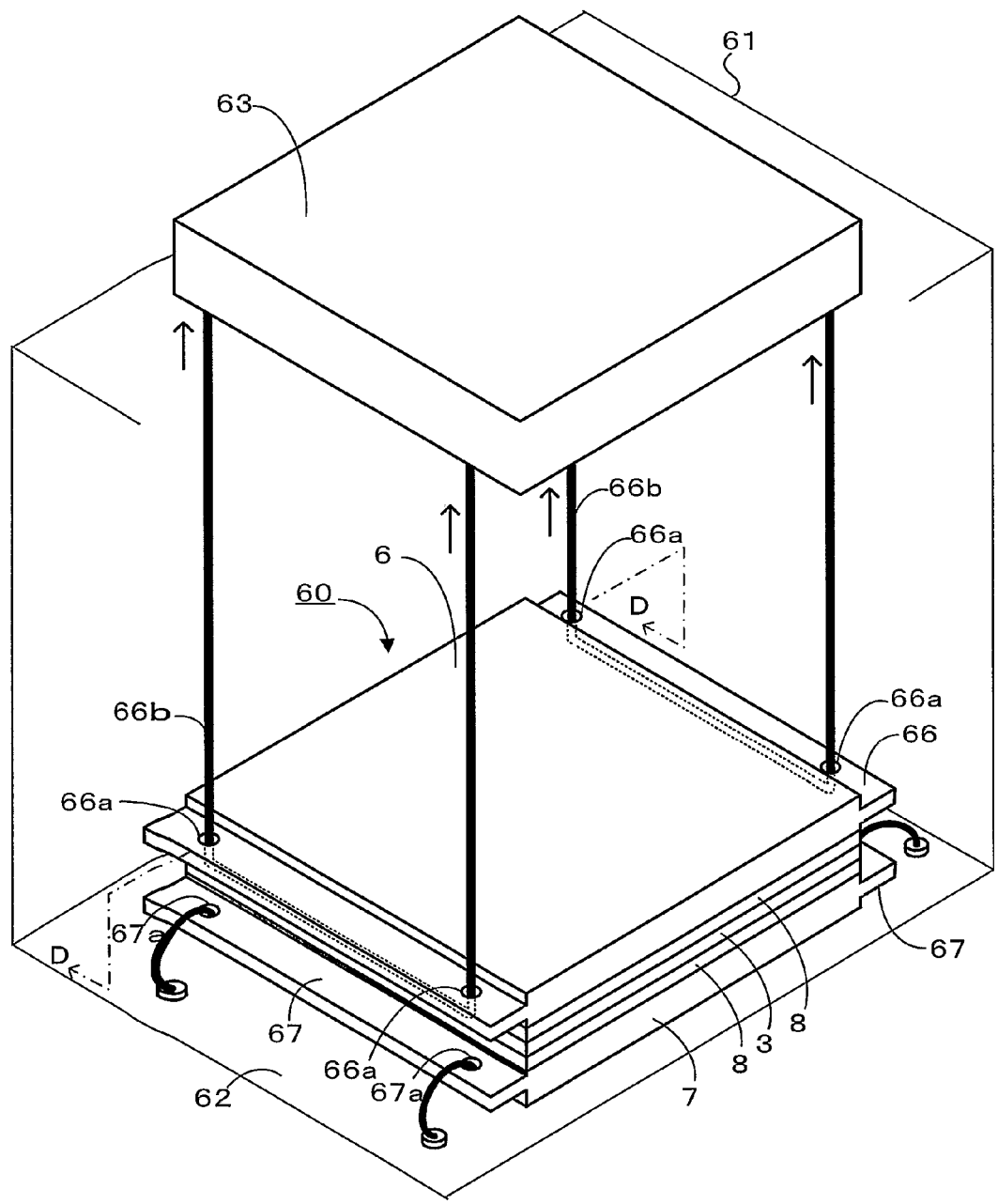
FIG. 10 is a perspective view showing application of an external force via wires in the direction of mutually parting a pair of separators.
Figure 11:
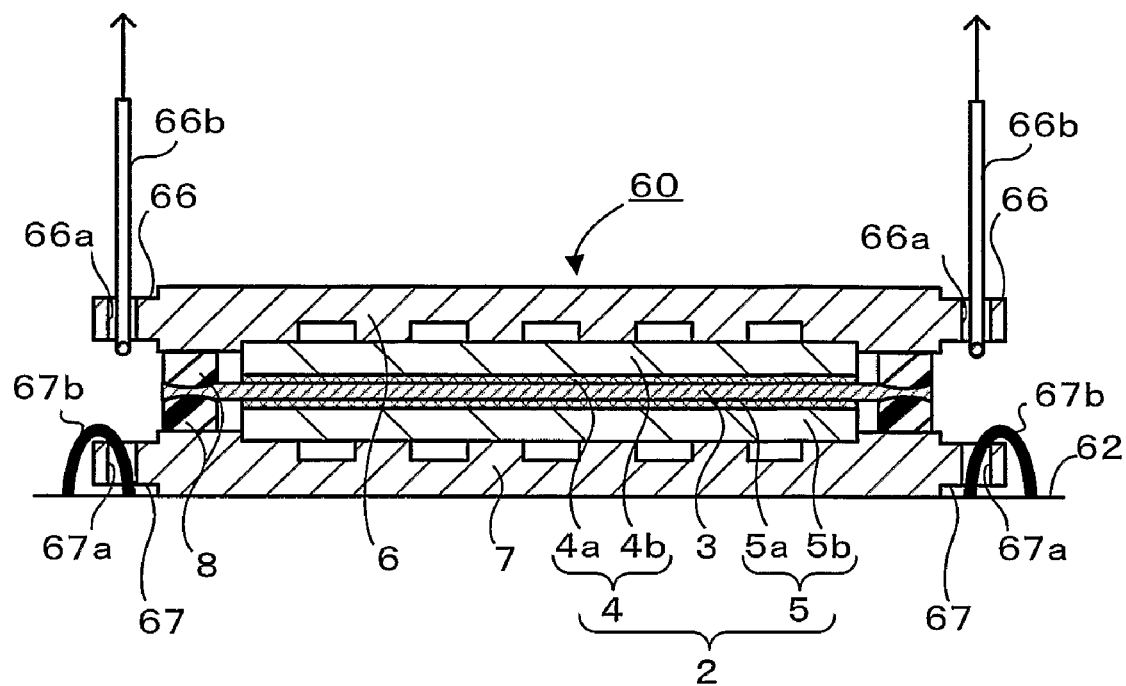
FIG. 11 is a sectional view taken on the line D-D of FIG. 10.

Another structure shown in FIGS. 10 and 11 may be adopted to apply an external force in a direction of mutually parting the pair of separators 6 and 7. FIG. 10 is a perspective view showing application of an external force via wires 66b in the direction of mutually parting the pair of separators 6 and 7. FIG. 11 is a sectional view taken on the line D-D of FIG. 10. A fuel cell 60 has a similar structure to that of the fuel cell 10 described above, except that rims 66 and 67 are formed along respective two sides of the separators 6 and 7. The like elements are expressed by the like numerals and are not specifically described here. In this fuel cell 60, the rims 66 are formed on two opposed side faces of the separator 6 and respectively have two through holes 66a, 66a. Similarly the rims 67 are formed on two opposed side faces of the separator 7 and respectively have two through holes 67a, 67a. A method of disassembling this fuel cell 60 first places the fuel cell 60 on a table 62 in a heating furnace 61, passes the wires 66b downward through one of the through holes 66a and then upward through the other of the through holes 66a, and passes wires 67b through the through holes 67a, and fixes both the ends of the wires 67b to the table 62. The method then uses a hoist gear 63 to pull up both the ends of the wires 66b and thereby apply an external force of parting the separator 6 from the separator 7 fastened to the table 62. The hoist gear 63 corresponds to the external force application means of the invention. The internal temperature of the heating furnace 61 is regulated to be not lower than the softening temperature of the sealing layers 8. For example, the heating furnace 61 is kept at 500° C. for 1 hour to soften or melt the sealing layers 8. This arrangement further facilitates separation of the separators 6 and 7. The rims 66 and the through holes 66a may be arranged at any desirable positions in any desirable numbers, as long as the rims 66 and the through holes 66a function to lift up the separator 6 and do not interfere with smooth supply and discharge of the reactive gases (the oxidizing gas and the fuel gas) and the coolant. The rims 67 and the through holes 67a may be arranged at any desirable positions in any desirable numbers, as long as the rims 67 and the through holes 67a function to fix the separator 7 and do not interfere with smooth supply and discharge of the reactive gases and the coolant.

Voltage measurement terminals extended from the periphery of the respective separators or stack pressing member attachment elements extended from the periphery of the respective separators, if any, may be used, instead of the rims 66 and the through holes 66a, to apply the external force in the direction of mutually parting the pair of separators 6 and 7. The stack pressing member is used to press multiple fuel cells of a fuel cell stack and thereby make adjoining separators stick together. Typical examples of the stack pressing member include bolts and tension plates. The use of the existing structure or the combined use of the existing structure to receive an external force applied by the external force application means desirably prevents the size increase and the weight increase of the separators.

The above embodiment uses the electric heaters 21 through 24. Gas heaters or hot blast heaters may be used instead of the electric heaters. The heaters may also be replaced by gas burners or heating furnaces. In any of these modified structures, the temperature of the sealing layers 8 is measured directly or indirectly and is regulated to be not lower than the softening temperature of the sealing layers 8 but lower than the upper temperature limit of the MEA 2.

The above first embodiment regards the polymer electrolyte fuel cell. The principle of the invention is also applicable to other types of fuel cells including solid oxide fuel cells, molten carbonate fuel cells, phosphoric acid fuel cells, and alkaline fuel cells.

Second Embodiment

Figure 12:
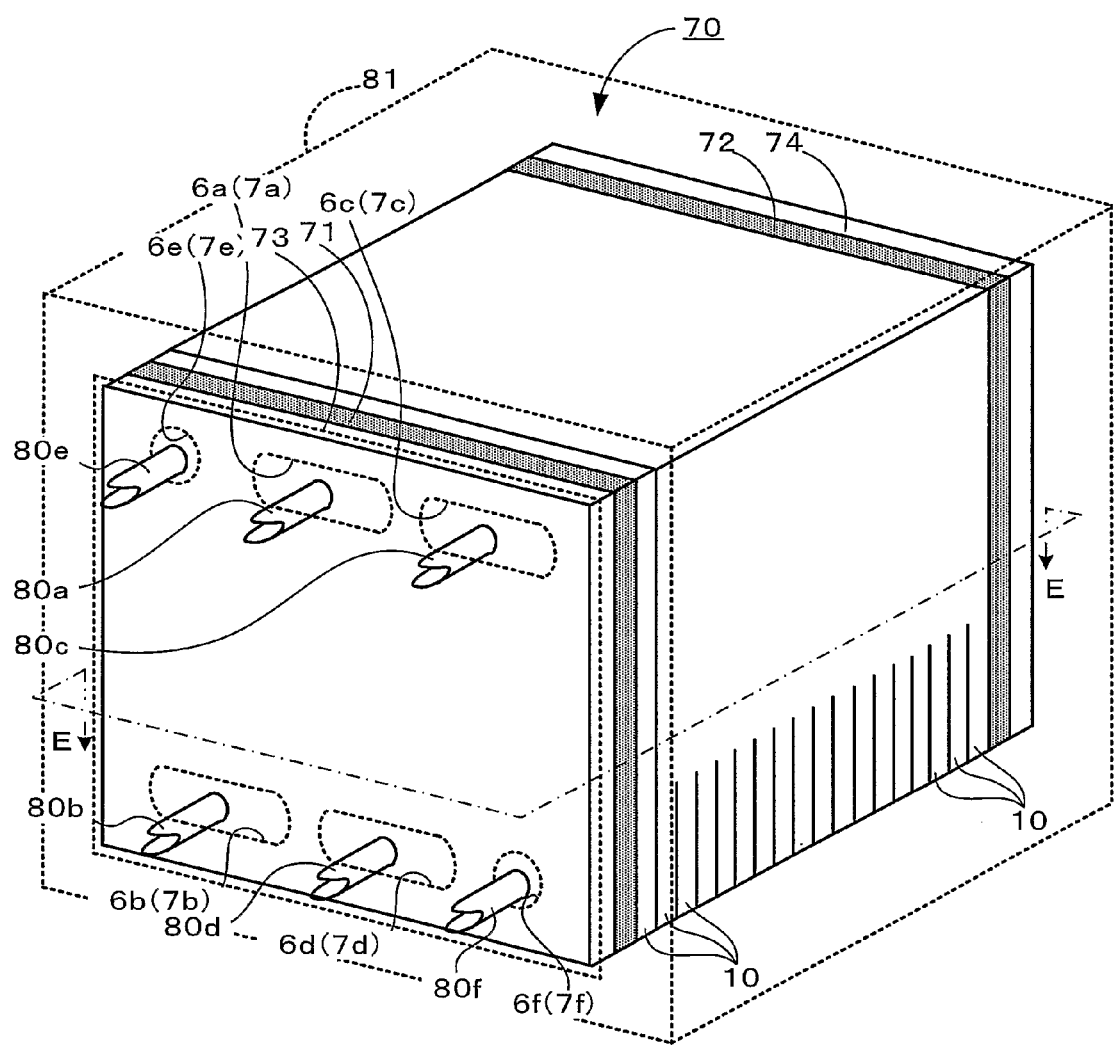
FIG. 12 is a perspective view showing a fuel cell stack 70 in state of power generation in a second embodiment.
Figure 13:
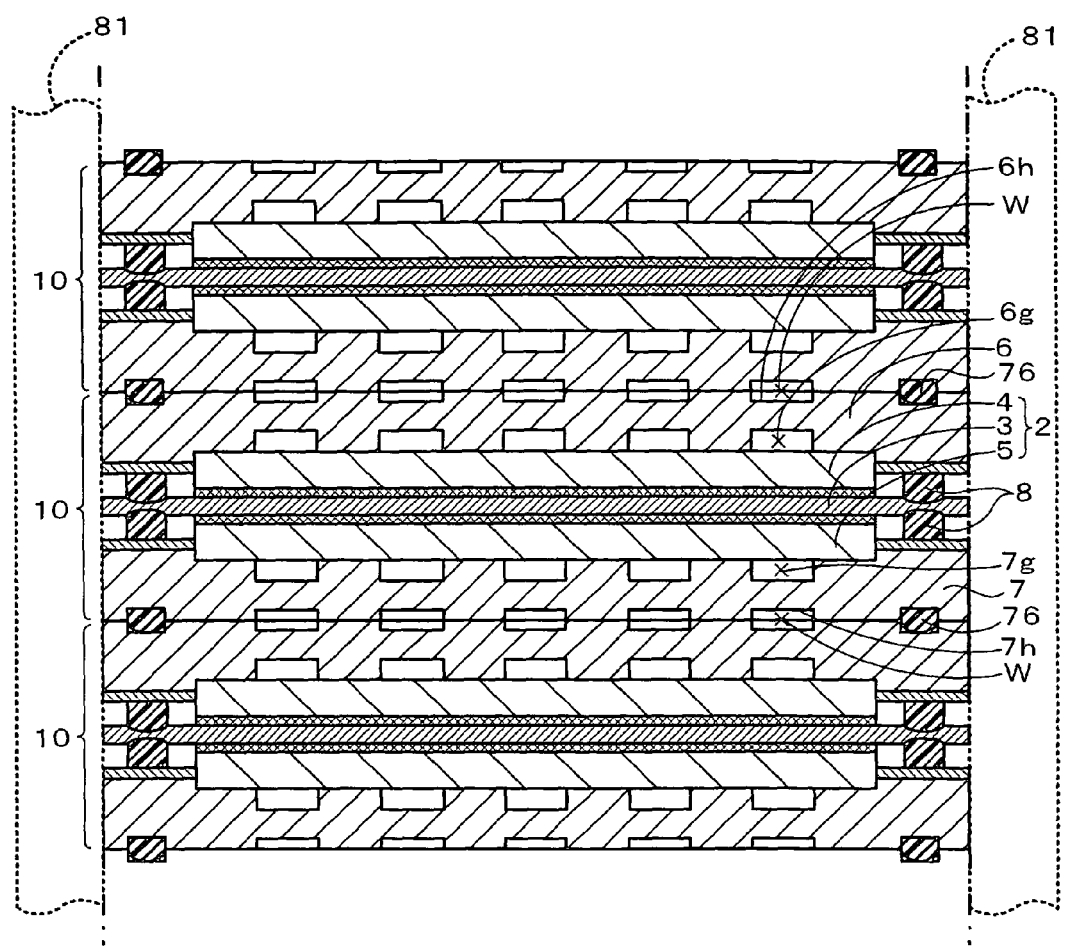
FIG. 13 is a sectional view taken on a line B-B of FIG. 12.

A second embodiment of the invention regards a fuel cell stack 70, which is a layered body of plurality of the fuel cells 10. FIG. 12 is a perspective view showing the fuel cell stack 70 in the state of power generation in the second embodiment of the invention. FIG. 13 is a sectional view taken on a line B-B of FIG. 12. In the illustration of FIGS. 12 and 13, the respective constituents of the fuel cells 10 are expressed by the like numerals and symbols to those of the first embodiment.

As shown in FIG. 12, the fuel cell stack 70 has a cell laminate of the multiple fuel cells 10 of the first embodiment, which are closely and tightly layered one upon another, and end plates 73 and 74 that are arranged across the cell laminate via insulator plates 71 and 72 and are pressed in a compression direction with a pressing force F1 applied by a pressure device (not shown). The fuel cell stack 70 is used as a power source of several hundred volts. The end plate 73 shown on the front side of FIG. 12 has supply pipes 80a, 80c, and 80e to feed the supplies of the fuel gas, the oxidizing gas, and the coolant to the fuel gas supply inlets 6a and 7a, the oxidizing gas supply inlets 6c and 7c, and the coolant supply inlets 6e and 7e of the respective fuel cells 10 via the insulator plate 71. The end plate 73 also has discharge pipes 80b, 80d, and 80f to discharge the exhausts of the fuel gas, the oxidizing gas, and the coolant from the fuel gas discharge outlets 6b and 7b, the oxidizing gas discharge outlets 6d and 7d, and the coolant discharge outlets 6f and 7f of the respective fuel cells 10 via the insulator plate 71. The insulator plate 72 shown on the backside of FIG. 12 is a blockage plate to block the respective inlets and outlets 6a to 6f and 7a to 7f. In the fuel cell stack 70, the fuel gas supply inlets 6a and 7a of the respective fuel cells 10 are sequentially connected to form a fuel gas supply manifold, while the fuel gas discharge outlets 6b and 7b of the respective fuel cells 10 are sequentially connected to form a fuel gas exhaust manifold. The oxidizing gas supply inlets 6c and 7c of the respective fuel cells 10 are sequentially connected to form an oxidizing gas supply manifold, while the oxidizing gas discharge outlets 6d and 7d of the respective fuel cells 10 are sequentially connected to form an oxidizing gas exhaust manifold. The coolant supply inlets 6e and 7e of the respective fuel cells 10 are sequentially connected to form a coolant supply manifold, while the coolant discharge outlets 6f and 7f of the respective fuel cells 10 are sequentially connected to form a coolant exhaust manifold. In each of the fuel cells 10, the fuel gas supply inlets 6a and 7a are connected with the fuel gas discharge outlets 6b and 7b via the fuel gas conduit 6g (see FIG. 13). The oxidizing gas supply inlets 6c and 7c are connected with the oxidizing gas discharge outlets 6d and 7d via the oxidizing gas conduit 7g (see FIG. 13). The coolant supply inlets 6e and 7e are connected with the coolant discharge outlets 6f and 7f via a coolant conduit W (see FIG. 13).

Although not being specifically illustrated in the first embodiment, coolant conduit forming concaves 6h and 7h are provided on the rear faces of the separators 6 and 7 as shown in FIG. 13. As the rear faces of the separators 6 and 7 are stuck together, the opposing coolant conduit forming concaves 6h and 7h are combined to form the coolant conduit W. The coolant conduit W is sealed with a sealing layer 76 which corresponds to an inter-cell adhesive layer of the present invention and is arranged along the outer ends of the rear faces of the separators 6 and 7. The sealing layer 76 prevents the flow of the coolant through the coolant conduits W from leaking out of the fuel cells 10. The rear faces of the separators 6 and 7 are in close contact with each other, except the coolant conduit W and the sealing layer 76. The sealing layers 8 are arranged to surround the periphery of the MEA 2 between the pair of separators 6 and 7. These sealing layers 8 prevent the air and the hydrogen gas from being mixed in the periphery of the MEA 2, while preventing the flows of the air and the hydrogen gas from leaking out of the fuel cells 10. The close contact of the rear faces of the separators 6 and 7 ensure the sufficient electric conductivity of the laminated fuel cells 10, while preventing localization of a stress under application of the pressing force F1 by the pressure device (not shown).

In the power generation state, the fuel cell stack 70 receives the pressing force F1 applied in the compression direction by the pressure device (not shown). In this state, the supply of the fuel gas (hydrogen) fed from the pipe 80a of the fuel cell stack 70 flows through the fuel gas supply inlets 6a and 7a, the fuel gas conduits 6g, and the fuel gas discharge outlets 6b and 7b of the respective fuel cells 10 included in the fuel cell stack 70 and is eventually discharged from the pipe 80b. The supply of the oxidizing gas (the air) fed from the pipe 80c of the fuel cell stack 70 flows through the oxidizing gas supply inlets 6c and 7c, the oxidizing gas conduits 7g, and the oxidizing gas discharge outlets 6d and 7d of the respective fuel cells 10 included in the fuel cell stack 70 and is eventually discharged from the pipe 80d. The supplies of the fuel gas and the oxidizing gas fed to the fuel cell stack 70 are subjected to the electrochemical reaction (discussed previously) in the respective fuel cells 10. The fuel cell stack 70 thus totally generates an electromotive force of several hundred volts. The coolant is flowed to keep the temperature of the fuel cell stack 70 in an adequate temperature range for power generation (for example, in a temperature range of 70 to 80° C.). The coolant fed from the pipe 80e flows through the coolant supply inlets 6*e* and 7*e*, the coolant conduits W, and the coolant discharge outlets 6*b* and 7*f* of the respective fuel cells 10 included in the fuel cell stack 70 and is eventually discharged from the pipe 80*f*. The discharged flow of the coolant goes through a heat exchanger (not shown) to be cooled down and is recirculated to the pipe 80*e*.

The procedure of disassembling the fuel cell stack 70 and the respective fuel cells 10 is described below. In the disassembly state, a weaker pressing force (may be equal to 0) than the pressing force applied in the power generation state is applied to the fuel cell stack 70 in the compression direction by the pressure device (not shown). The pressing force applied in the disassembly state may not be weaker but may be identical with the pressing force applied in the power generation state. The procedure then locates a tunnel heater 81 to cover over the whole side face of the fuel cell stack 70. The heater corresponds to the external heating means of the invention. The heater 81 is placed to cover over the sealing layers 8 and the sealing layers 76, as well as the gaps between the pair of separators 6 and 7 in the respective fuel cells 10 and the contact planes of the adjoining fuel cells 10. The procedure starts the power supply to the heater 81 and keeps heating until the sealing layers 8 and 76 are heated to or over the softening temperature and are softened or molten. A power supply circuit, which is similar to those included in the structure of the first embodiment, is attached to the heater 81, although not being specifically illustrated. This power supply circuit is regulated to start and cut off the power supply. Heating is regulated to prevent the sealing layers 8 and 76 from being heated to or over the upper temperature limit of the MEA 2. After the sealing layers 8 are softened or molten to weaken the adhesive force between the pair of separators 6 and 7 in the respective fuel cells 10 and the sealing layers 76 are softened or molten to weaken the adhesive force between the adjoining fuel cells 10, the heater 81 is detached from the fuel cell stack 70. The worker then disassembles the fuel cell stack 70 and the respective fuel cells 10 with some tool or by hand and removes the MEAs 2 from the respective fuel cells 10.

As described above, in the structure of this embodiment, the heater 81 is used to apply heat to the sealing layers 8 and thereby soften or melt the sealing layers 8. The softened or molten sealing layers 8 weaken the adhesive force between the separators 6 and 7 and thereby facilitate mutual separation of the pair of separators 6 and 7. The heater 81 is also used to apply heat to the sealing layers 76 and thereby soften or melt the sealing layers 76. The softened or molten sealing layers 76 weaken the adhesive force between the adjoining fuel cells 10 and thereby facilitate mutual separation of the adjoining fuel cells 10. This arrangement ensures effective disassembly of the fuel cells tack 70 and the respective fuel cells 10. The heater 81 is located to cover the gaps between the separators 6 and 7 in the respective fuel cells 10 and the contact planes of the adjoining fuel cells 10 and thus readily applies heat to the sealing layers 8 placed in the gaps between the separators 6 and 7 and the sealing layers 76 located on the contact planes of the adjoining fuel cells 10. The heat applied to the sealing layers 8 and the sealing layers 76 by the heater 81 is not lower than the softening temperature of the sealing layers 8 and the sealing layers 76 but is lower than the upper temperature limit of the MEA 2. The MEA 2 is thus not significantly altered or deteriorated by the heat application, which softens or melts the sealing layers 8 and the sealing layers 76. The separators 6 and 7 are bonded to each other via the sealing layers 8, which have the sealing function to prevent leakage of the fuel gas and the oxidizing gas fed to the MEA 2, while the adjoining fuel cells 10 are bonded to each other via the sealing layers 76, which have the sealing function to prevent leakage of the coolant. This structure is desirably simpler than the conventional structure having separate sealing members and adhesive members.

The embodiment discussed above is to be considered in all aspects as illustrative and not restrictive. There may be many modifications, changes, and alterations without departing from the scope or spirit of the main characteristics of the present invention.

Figure 14:
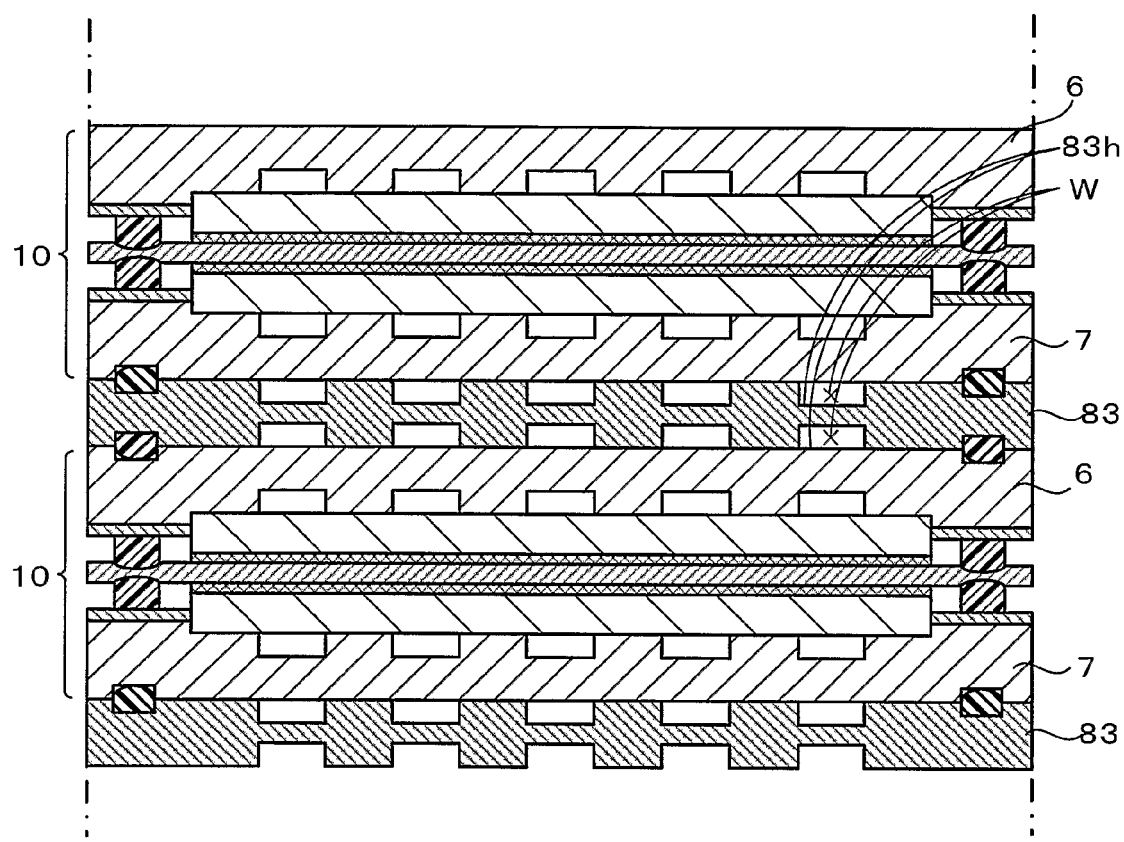
FIG. 14 is a sectional view showing a fuel cell stack in one modified structure.

For example, in the structure of the second embodiment discussed above, the adjoining fuel cells 10 are bonded to each other via the sealing layers 76. In one modified structure, the adjoining fuel cells 10 may be bonded to each other across a coolant conduit separator. As shown in FIG. 14, coolant conduit forming grooves are not formed in the separators 6 and 7 of each fuel cell 10, but coolant conduit forming grooves 83*h* are formed in both faces of a coolant conduit separator 83 to define the coolant conduits W. The sealing layers 76 for sealing the coolant conduits W may be placed between the coolant conduit separator 83 and the respective separators 6 and 7 of each fuel cell 10. In this modified structure, the adjoining fuel cells 10 are indirectly bonded to each other across the coolant conduit separator 83 as an intermediate. The heater 81 is used in this modified structure to facilitate separation of the fuel cell stack 70 and separation of the respective fuel cells 10.

The procedure of the second embodiment simultaneously softens or melts both the sealing layers 8 and the sealing layers 76. One modified procedure may successively heat the sealing layers 8 and the sealing layers 76. This modified arrangement also ensures the similar effects to those of the above embodiment. Another modified procedure may soften or melt only the sealing layers 8 to facilitate mutual separation of the pair of separators 6 and 7 or may soften or melt only the sealing layers 76 to facilitate mutual separation of the adjoining fuel cells 10.

Third Embodiment

Figure 15:
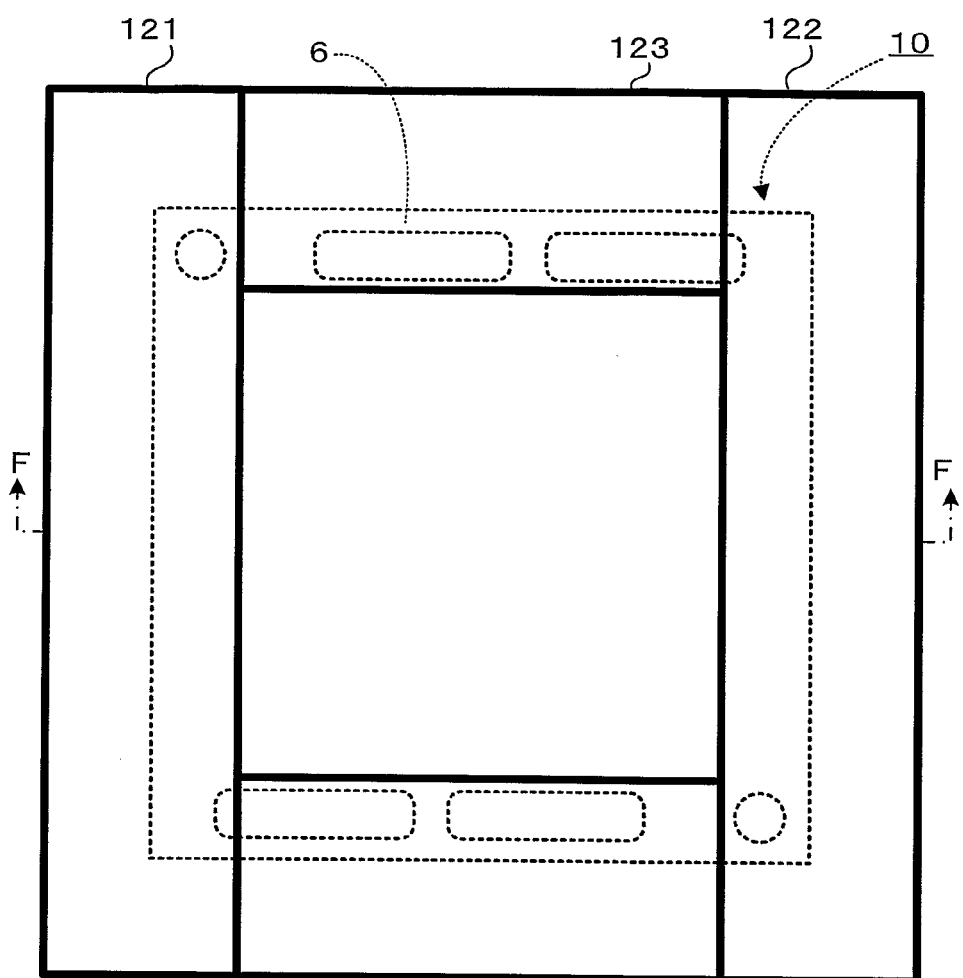
FIG. 15 shows arrangement of heat removers.
Figure 15:
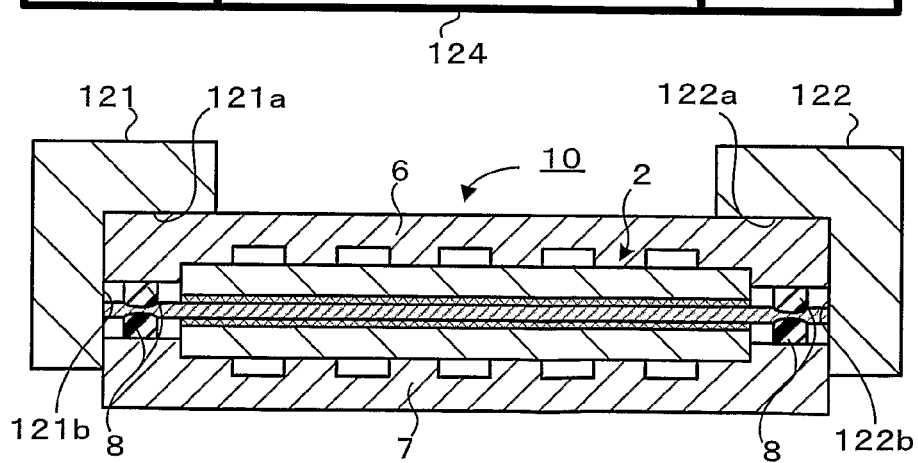

A third embodiment of the invention regards a method of disassembling the fuel cell 10 according to the requirements. FIG. 15 shows arrangement of heat removers 121 through 124 set on the fuel cell 10. FIG. 15(*a*) is a plan view and FIG. 15(*b*) is a sectional view taken on the line F-F of FIG. 15(*a*). The like elements to those of the first embodiment are expressed by the like numerals and are not specifically described here. The metal heat removers 121 through 124 of good heat conduction are cooled down to minus several tens ° C. in a freezer and are taken out of the freezer at the time of disassembly of the fuel cell 10. As shown in FIG. 15, the cooled heat removers 121 through 124 are located along four sides of the upper separator 6 of the fuel cell 10, that is, along the sealing layers 8. These heat removers 121 through 124 correspond to the external heat removal means of the present invention. As shown in FIG. 15(*b*), the heat removers 121 and 122 are formed in substantially L-shaped cross section and respectively have upper separator contact planes 121*a* and 122*a* that are in contact with the separator 6 and gap cover planes 121*b* and 122*b* that cover the gaps between the separators 6 and 7. Like the heat removers 121 and 122, the heat removers 123 and 124 are also formed in substantially L-shaped cross section and have separator contact planes that are in contact with the separator 6 and gap cover planes that cover the gaps between the separators 6 and 7, although not being specifically illustrated. The heat removers 121 through 124 are kept at the temperature of minus several ° C. to minus several tens ° C. by means of dry ice or a small-sized cooler. The heat removers 121 through 124 gradually remove heat to cool down and contract the sealing layers 8. After the contracted sealing layers 8 weaken the adhesive force between the pair of separators 6 and 7, the heat removers 121 through 124 are detached from the fuel cell 10. The worker then completely separates the pair of separators 6 and 7 from each other with some tool or by hand and removes the MEA 2 from the fuel cell 10.

As described above, in the structure of this embodiment, the heat removers 121 through 124 are used to remove heat from the sealing layers 8 and thereby contract the sealing layers 8, in order to facilitate the mutual separation of the pair of separators 6 and 7. The contracted sealing layers 8 weaken the adhesive force between the separators 6 and 7 and thereby facilitate mutual separation of the pair of separators 6 and 7. This arrangement ensures effective disassembly of the fuel cell 10. The heat removers 121 through 124 are readily arranged to be in contact with the separator 6 having a relatively wide area. The heat removers 121 through 124 are also arranged to cover the gaps between the separators 6 and 7. This arrangement ensures effective removal of heat from the sealing layers 8 located in the gaps. The heat removers 121 through 124 remove heat from the sealing layers 8 via the gaps between the separators 6 and 7, as well as via the separator 6. This arrangement ensures a quick temperature drop of the sealing layers 8. The heat removers 121 through 124 are located along the sealing layers 8. This arrangement enables the heat removers 121 through 124 to efficiently remove heat from the sealing layers 8. The separators 6 and 7 are bonded to each other via the sealing layers 8, which have the sealing function to prevent leakage of the fuel gas and the oxidizing gas fed to the MEA 2. This structure is desirably simpler than the conventional structure having separate sealing members and adhesive members.

The embodiment discussed above is to be considered in all aspects as illustrative and not restrictive. There may be many modifications, changes, and alterations without departing from the scope or spirit of the main characteristics of the present invention.

Figure 16:
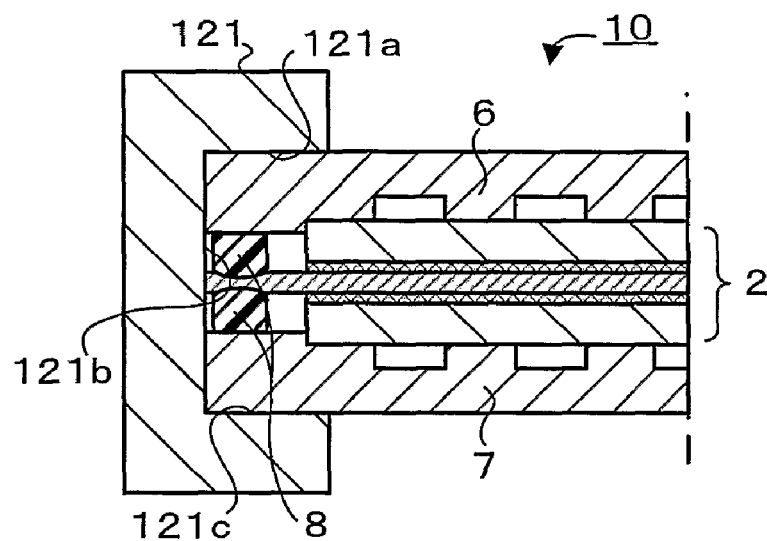
FIG. 16 is a sectional view showing arrangement of heat removers of one modified form.
Figure 17:
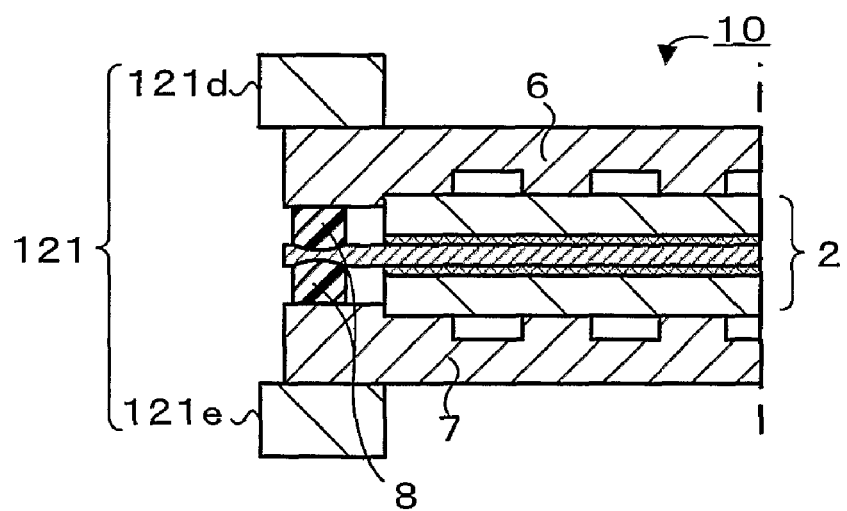
FIG. 17 is a sectional view showing arrangement of heat removers of another modified form.

For example, in the above embodiment, the respective heat removers 121 through 124 are formed in substantially L-shaped cross section. As shown in FIG. 16, each heat remover may have a substantially C-shaped cross section. The heat remover 121 may have an upper separator contact plane 121a that is in contact with the separator 6, a gap cover plane 121b that covers the gap between the separators 6 and 7, and a lower separator contact plane 121c that is in contact with the separator 7. The other heat removers 122 through 124 may be formed to have a similar cross section to that of the heat remover 121. As shown in FIG. 17, each heat remover may have upper and lower split sections. The heat remover 121 may have an upper separator contact section 121d that is in contact with the separator 6 and a lower separator contact section 121e that is in contact with the separator 7. The other heat removers 122 through 124 may be formed to have similar split sections to those of the heat remover 121. The heat remover 121 may be formed as a member having only the upper separator contact plane 121a that is in contact with the separator 6, as a member having only the gap cover plane 121b that covers the gap between the separators 6 and 7, or as a member having only the lower separator contact plane 121c that is in contact with the separator 7.

Figure 18:
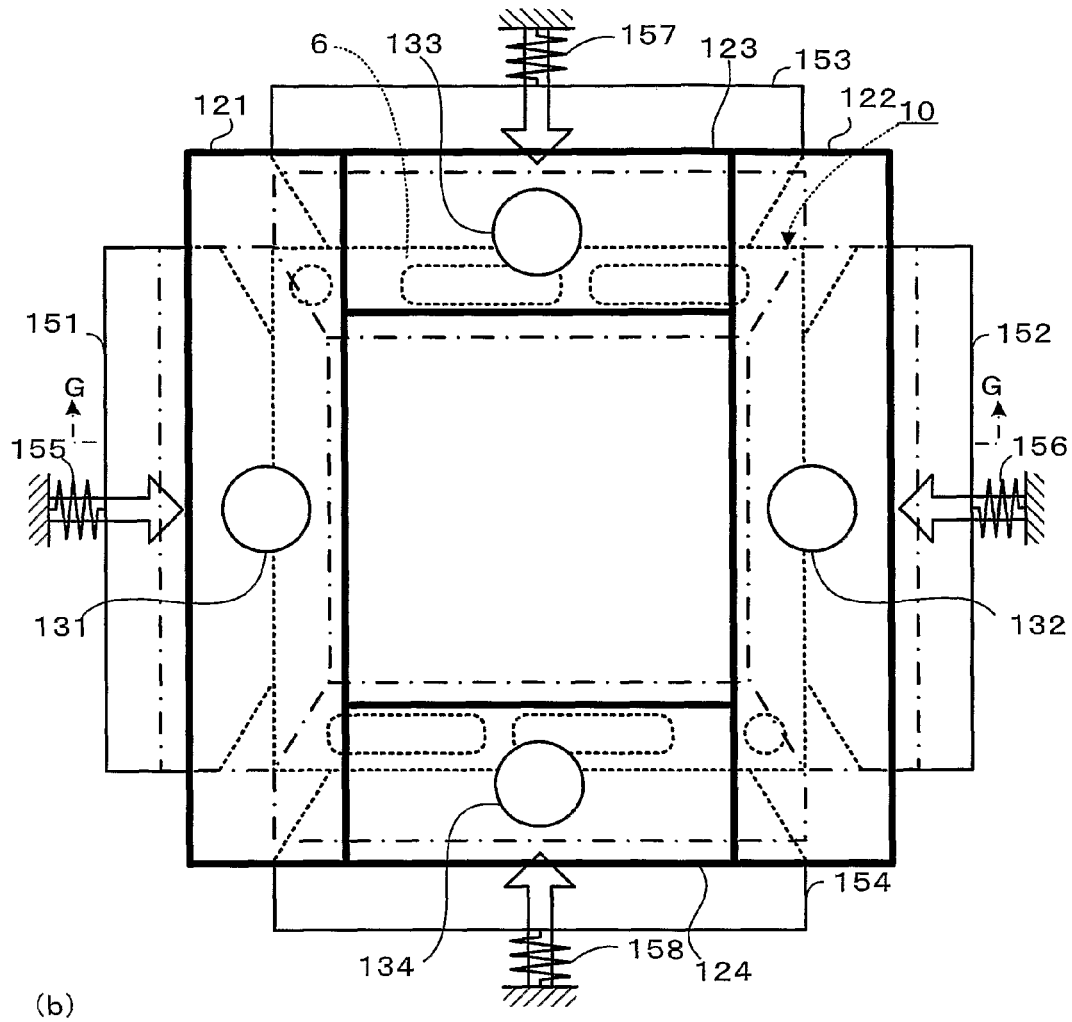
FIG. 18 shows arrangement of the heat removers.
Figure 18:
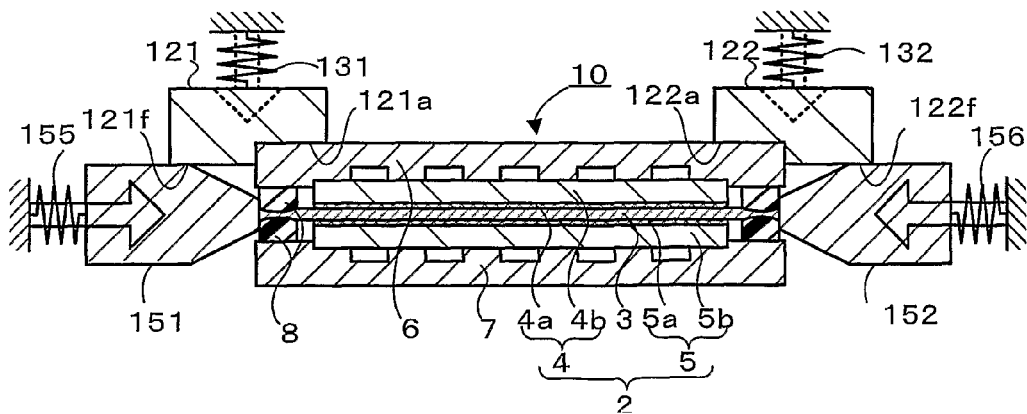

In the structure of the above embodiment, an external force may be applied in a direction of mutually parting the pair of separators 6 and 7 under removal of heat from the sealing layers 8 by means of the heat removers 121 through 124 as shown in FIG. 18. FIG. 18 shows arrangement of the heat removers 121 through 124 and insertion members 151 through 154 set on the fuel cell 10. FIG. 18(a) is a plan view and FIG. 18(b) is a sectional view taken on the line G-G of FIG. 18(a). As shown in FIG. 18, the insertion members 151 through 154 having wedge-like ends are located on the respective sides of the substantially rectangular fuel cell 10 to be inserted between the separators 6 and 7. Springs 155 through 158 as pressing members press the insertion members 151 through 154 in a direction of insertion between the separators 6 and 7. The heat removers 121 through 124 are cooled down to minus several tens ° C. in a freezer. Other springs 131 through 134 as pressing members press the heat removers 121 through 124 toward the separator 6. The heat removers 121 and 122 among the heat removers 121 through 124 are pressed by the corresponding springs 131 and 132 to be forcibly in contact with the separator 6 and the insertion members 151 and 152. The heat removers 121 and 122 are formed in substantially L-shaped cross section but do not cover the gaps between the separators 6 and 7 unlike the structure of the embodiment. The heat removers 121 and 122 are formed to have upper separator contact planes 121a and 122a that are in contact with the separator 6 and insertion member contact planes 121f and 122f that are in contact with the insertion members 151 and 152. The heat removers 123 and 124 are formed to have similar cross sections to those of the heat removers 121 and 122, although not being specifically illustrated. The heat removers 121 through 124 are kept at the temperature of minus several ° C. to minus several tens ° C. by means of dry ice or a small-sized cooler. The heat removers 121 through 124 gradually remove heat from the sealing layers 8 to cool down and contract the sealing layers 8. As the sealing layers 8 are contracted to weaken the adhesive force between the pair of separators 6 and 7, the wedge-like ends of the respective insertion members 151 through 154 enter the depths of the gaps between the separators 6 and 7. This applies the force of expanding the gaps between the separators 6 and 7, that is, the external force in the direction of mutually parting the separators 6 and 7. The insertion members 151 through 154 thus further facilitate separation of the separators 6 and 7. The insertion members 151 through 154 are inserted into the gaps between the separators 6 and 7, while being cooled down by the heat removers 121 through 124. Heat is thus additionally removed from the sealing layers 8 via the insertion members 151 through 154. This ensures a quicker temperature drop of the sealing layers 8. The heat removers 121 through 124 may be omitted from the structure of FIG. 18, and the insertion members 151 through 154 may be designed to have heat removal functions. This desirably simplifies the whole structure.

The structure shown in FIGS. 10 and 11 may be adopted to apply the external force in the direction of mutually parting the pair of separators 6 and 7. In this case, however, the heating furnace 61 is replaced by a freezer.

The above third embodiment regards the polymer electrolyte fuel cell. The principle of the invention is also applicable to other types of fuel cells including solid oxide fuel cells, molten carbonate fuel cells, phosphoric acid fuel cells, and alkaline fuel cells.

Fourth Embodiment

Figure 19:
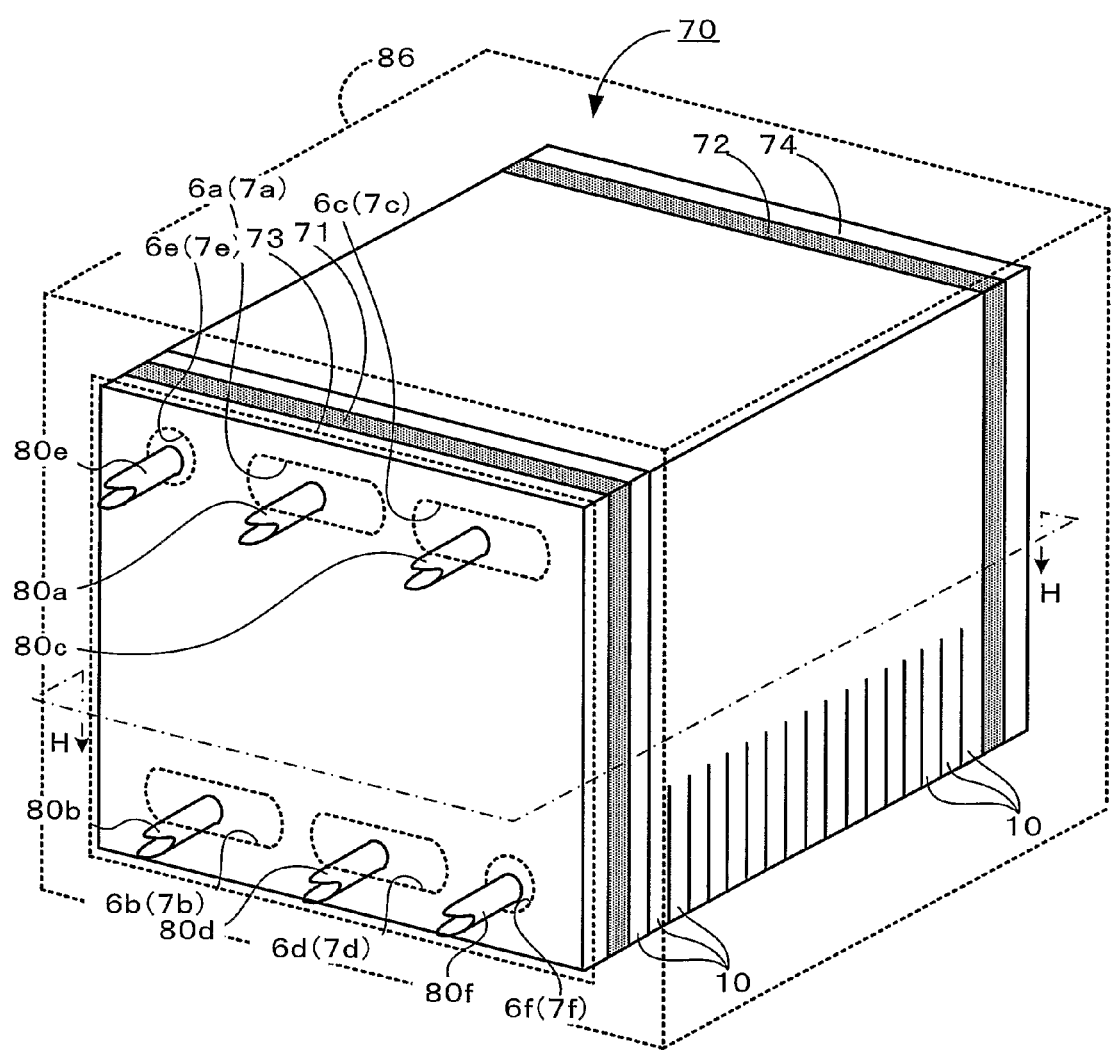
FIG. 19 is a perspective view showing a fuel cell stack 70 in state of power generation in a fourth embodiment of the invention.
Figure 20:
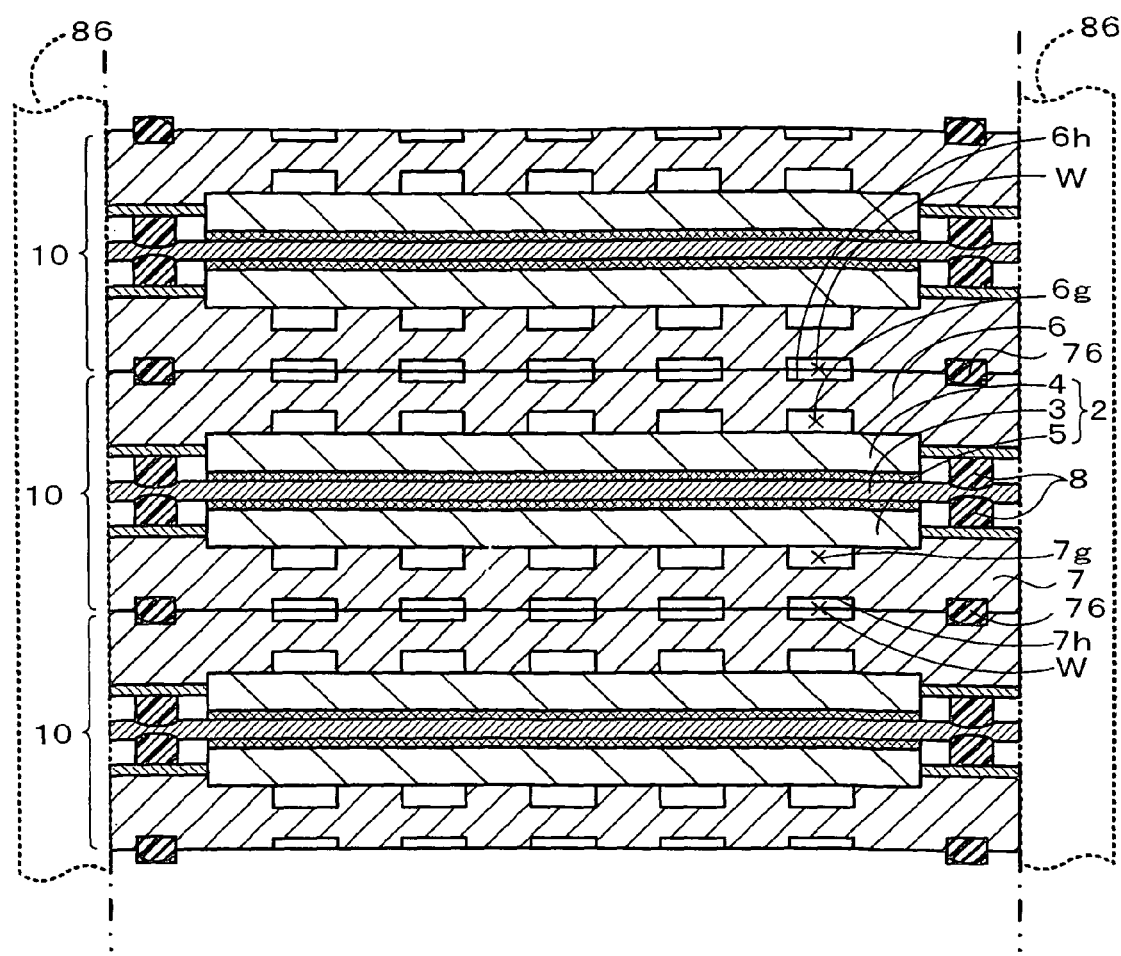
FIG. 20 is a sectional view taken on a line H-H of FIG. 19.

A fourth embodiment of the invention regards a fuel cell stack 70, which is a layered body of plurality of the fuel cells 10. FIG. 19 is a perspective view showing the fuel cell stack 70 in the state of power generation in the fourth embodiment of the invention. FIG. 20 is a sectional view taken on a line H-H of FIG. 19. The fuel cell stack 70 of the fourth embodiment has the identical structure with that of the fuel cell stack 70 described in the second embodiment. Each fuel cell 10 of the fourth embodiment has the identical structure with that of the fuel cell 10 of the first embodiment. The like elements are thus expressed by the like numerals and are not specifically described here. The operation of the fuel cell stack 70 of the fourth embodiment in the state of power generation is identical with that of the second embodiment and is thus not specifically described here.

The procedure of disassembling the fuel cell stack 70 and the respective fuel cells 10 is described below. In the disassembly state, a weaker pressing force (may be equal to 0) than the pressing force applied in the power generation state is applied to the fuel cell stack 70 in the compression direction by the pressure device (not shown). The pressing force applied in the disassembly state may not be weaker but may be identical with the pressing force applied in the power generation state. The procedure then locates a tunnel heat remover 86 to cover over the whole side face of the fuel cell stack 70. The heat remover 86, for example, has a built-in air-cooling, sealed-type freezer and corresponds to the external heat removal means of the invention. The heat remover 86 is placed to cover over the sealing layers 8 and the sealing layers 76, as well as the gaps between the pair of separators 6 and 7 in the respective fuel cells 10 and the contact planes of the adjoining fuel cells 10. The procedure switches on the built-in freezer in the heat remover 86 to start cooling and keeps cooling until the sealing layers 8 and 76 are contracted. After the sealing layers 8 are contracted to weaken the adhesive force between the pair of separators 6 and 7 in the respective fuel cells 10 and the sealing layers 76 are contracted to weaken the adhesive force between the adjoining fuel cells 10, the heat remover 86 is detached from the fuel cell stack 70. The worker then disassembles the fuel cell stack 70 and the respective fuel cells 10 with some tool or by hand and removes the MEAs 2 from the respective fuel cells 10.

As described above, in the structure of this embodiment, the heat remover 86 is used to remove heat from the sealing layers 8 and thereby contract the sealing layers 8, in order to facilitate the mutual separation of the pair of separators 6 and 7. The contracted sealing layers 8 weaken the adhesive force between the separators 6 and 7 and thereby facilitate mutual separation of the pair of separators 6 and 7. The heat remover 86 is also used to remove heat from the sealing layers 76 and thereby contract the sealing layers 76. The contracted sealing layers 76 weaken the adhesive force between the adjoining fuel cells 10 and thereby facilitate mutual separation of the adjoining fuel cells 10. This arrangement ensures effective disassembly of the adjoining fuel cells. The heat remover 86 is arranged to cover the gaps between the separators 6 and 7 in the respective fuel cells 10 and the contact planes of the adjoining fuel cells 10 and thus readily removes heat from the sealing layers 8 placed in the gaps between the separators 6 and 7 and from the sealing layers 76 located on the contact planes of the adjoining fuel cells 10. This arrangement ensures effective removal of heat from the sealing layers 8 and the sealing layers 76. The separators 6 and 7 are bonded to each other via the sealing layers 8, which have the sealing function to prevent leakage of the fuel gas and the oxidizing gas fed to the MEA 2, while the adjoining fuel cells 10 are bonded to each other vie the sealing layer 76, which has the sealing function to prevent leakage of the coolant. This structure is desirably simpler than the conventional structure having separate sealing members and adhesive members.

The embodiment discussed above is to be considered in all aspects as illustrative and not restrictive. There may be many modifications, changes, and alterations without departing from the scope or spirit of the main characteristics of the present invention.

For example, in the structure of the fourth embodiment discussed above, the adjoining fuel cells 10 are indirectly bonded to each other via a coolant conduit separator 83 shown in FIG. 14, as an intermediate. The heat remover 86 is used also in this modified structure to facilitate mutual separation.

The procedure of the fourth embodiment simultaneously contracts both the sealing layers 8 and the sealing layers 76. One modified procedure may successively remove heat from the sealing layers 8 and from the sealing layers 76. This modified arrangement also ensures the similar effects to those of the above embodiment. Another modified procedure may contract only the sealing layers 8 to facilitate mutual separation of the pair of separators 6 and 7 or may contract only the sealing layers 76 to facilitate mutual separation of the adjoining fuel cells 10.

In the first through the fourth embodiments discussed above, the sealing layers 8 and the sealing layers 76 are made by solidifying an adhesive. The sealing layers 8 and 76 may alternatively be formed by gaskets that are made of, for example, fluoroplastic or silicone resin.

Another method of externally heating the fuel cell 10 uses a hot liquid having a higher temperature than the temperature of the fuel cell 10, as the external heating means of the invention. The fuel cell 10 or the fuel cell stack 70 is soaked in the hot liquid, so that the sealing layers 8 or the sealing layers 76 are softened or molten. While the fuel cell 10 is soaked in the hot liquid, the hot liquid may be flowed through the flow paths formed in the fuel cell 10. This liquid is desirably pure water for recycle of the disassembled fuel cell 10. A gas may be flowed through the flow paths in the fuel cell 10 to forcibly discharge the liquid, prior to recycle. When pure water is used as the hot liquid, this pre-recycle step may be omitted.

INDUSTRIAL APPLICABILITY

The fuel cell of the invention is available as the power supply for automobiles, the power supply for domestic use, the power supply for business use, and the power supply for diverse electrical equipment.

The invention claimed is:

1. A fuel cell disassembly method of disassembling a fuel cell where a pair of separators arranged across an electrode assembly are bonded to each other via an adhesive layer, said fuel cell disassembly method comprising:
   a separation facilitating step of causing external heating means to apply heat to the adhesive layer, so as to soften or melt the adhesive layer and thereby facilitate separation of the pair of separators from each other;
   an external force application step of applying an external force by an external force application means in a direction of mutually parting the pair of separators, the external force application means in said separation facilitating step comprises a wedge-like member pressed in a direction of insertion into a gap between the pair of separators; and
   a heating step of heating the external force application means by the external heating means, wherein
   said separation facilitating step inserts the external force application means into the gap between the pair of separators, while the external force application means is heated by the external heating means.

2. A fuel cell disassembly method in accordance with claim 1, wherein said separation facilitating step locates the external heating means to be in contact with or close to at least one of the separators.

3. A fuel cell disassembly method in accordance with claim 1, wherein said separation facilitating step locates the external heating means along the adhesive layer.

4. A fuel cell disassembly method in accordance with claim 1, wherein said separation facilitating step causes the external heating means to apply heat to the adhesive layer to be not lower than a softening temperature of the adhesive layer but lower than an upper temperature limit of the electrode assembly.

5. A fuel cell disassembly method in accordance with claim 1, wherein said separation facilitating step causes the external heating means to apply heat to the adhesive layer, while the external force is applied by the external force application means in the direction of mutually parting the pair of separators.

6. A fuel cell disassembly method in accordance with claim 5, wherein the external force application means in said separation facilitating step applies the external force to an extension of one of the separators to separate one of the separators from the other of the separators.

7. A fuel cell disassembly method in accordance with claim 1, wherein said separation facilitating step causes the external heating means to apply heat to the adhesive layer while applying the external force in the direction of mutually parting the pair of separators.

8. A fuel cell disassembly method in accordance with claim 1, wherein the adhesive layer is arranged around periphery of the electrode assembly and has a sealing function to prevent leakage of a gas fed to the electrode assembly.

9. A fuel cell disassembly method in accordance with claim 1, wherein plurality of the fuel cells are layered to form a fuel cell stack, and said separation facilitating step causes the external heating means to additionally apply heat to an inter-cell adhesive layer that bonds adjoining fuel cells to each other directly or indirectly via an intermediate in the fuel cell stack, so as to soften or melt the inter-cell adhesive layer and thereby facilitate separation of the adjoining fuel cells.

10. A fuel cell stack disassembly method of disassembling a fuel cell stack having an inter-cell adhesive layer that bonds adjoining fuel cells to each other directly or indirectly via an intermediate, said fuel cell stack disassembly method comprising:

a separation facilitating step of causing external heating means to apply heat to the inter-cell adhesive layer, so as to soften or melt the inter-cell adhesive layer and thereby facilitate separation of the adjoining fuel cells;

an external force application step of applying an external force by an external force application means in a direction of mutually parting the pair of separators, the external force application means in said separation facilitating step comprises a wedge-like member pressed in a direction of insertion into a gap between the pair of separators; and a heating step of heating the external force application means by the external heating means, wherein said separation facilitating step inserts the external force application means into the gap between the pair of separators, while the external force application means is heated by the external heating means.

* * * * *